United States Patent
Fujimoto

(10) Patent No.: US 7,353,434 B2
(45) Date of Patent: **\*Apr. 1, 2008**

(54) METHOD FOR CONTROLLING STORAGE SYSTEM

(75) Inventor: Shuji Fujimoto, Yokohama (JP)

(73) Assignee: Hitachi, Ltd., Tokyo (JP)

(\*) Notice: Subject to any disclaimer, the term of this patent is extended or adjusted under 35 U.S.C. 154(b) by 0 days.

This patent is subject to a terminal disclaimer.

(21) Appl. No.: 11/346,763

(22) Filed: Feb. 3, 2006

(65) Prior Publication Data

US 2006/0150035 A1 Jul. 6, 2006

Related U.S. Application Data

(63) Continuation of application No. 10/651,559, filed on Aug. 29, 2003, now Pat. No. 7,024,595.

(30) Foreign Application Priority Data

Jan. 31, 2003 (JP) ............................. 2003-025071

(51) Int. Cl.
*G06F 11/00* (2006.01)

(52) U.S. Cl. .................... 714/54; 714/4; 714/5; 714/9; 714/13

(58) Field of Classification Search .................... 714/4, 714/5, 9, 13, 54
See application file for complete search history.

(56) References Cited

U.S. PATENT DOCUMENTS

| | | | |
|---|---|---|---|
| 5,155,845 A | 10/1992 | Beal et al. | |
| 5,544,347 A | 8/1996 | Yanai et al. | |
| 5,574,863 A | 11/1996 | Nelson et al. | |
| 5,579,222 A | 11/1996 | Bains et al. | |
| 5,636,341 A | 6/1997 | Matsushita et al. | |
| 5,668,943 A | 9/1997 | Attanasio et al. | |
| 5,671,412 A | 9/1997 | Christiano | |
| 5,720,028 A | 2/1998 | Matsumoto et al. | |
| 5,729,763 A | 3/1998 | Leshem | |
| 5,752,041 A | 5/1998 | Fosdick | |
| 5,774,640 A * | 6/1998 | Kurio ............................. 714/4 |
| 5,774,643 A | 6/1998 | Lubbers et al. | |
| 5,815,652 A | 9/1998 | Ote et al. | |
| 5,819,054 A | 10/1998 | Ninomiya et al. | |
| 5,845,061 A | 12/1998 | Miyamoto et al. | |
| 5,903,650 A | 5/1999 | Ross et al. | |

(Continued)

FOREIGN PATENT DOCUMENTS

JP 2002-279165 A 9/2002

*Primary Examiner*—Emerson Puente
(74) *Attorney, Agent, or Firm*—Townsend and Townsend and Crew LLP

(57) ABSTRACT

A storage system including: channel control portions each including a circuit board on which a file access processing portion for receiving file-by-file data input/output requests sent from information processors through a network and an I/O processor for outputting I/O requests corresponding to the data input/output requests to storage devices are formed; disk control portions for performing data input/output of the storage devices in response to the I/O requests sent from the I/O processors; and a computer communicatably connected to the channel control portions and the disk control portions. The storage system is formed so that when one of the channel control portions detects occurrence of failure in the channel control portion, the channel control portion gives a notice of occurrence of failure to the computer.

7 Claims, 20 Drawing Sheets

U.S. PATENT DOCUMENTS

| | | |
|---|---|---|
| 6,009,401 A | 12/1999 | Horstmann |
| 6,169,976 B1 | 1/2001 | Colosso |
| 6,189,146 B1 | 2/2001 | Misra et al. |
| 6,243,829 B1 | 6/2001 | Chan |
| 6,356,978 B1 | 3/2002 | Kobayashi et al. |
| 6,397,292 B1 | 5/2002 | Venkatesh et al. |
| 6,401,223 B1 | 6/2002 | DePenning |
| 6,408,400 B2 | 6/2002 | Taketa et al. |
| 6,523,138 B1 | 2/2003 | Natsume et al. |
| 6,539,461 B2 | 3/2003 | Suzuki et al. |
| 6,574,612 B1 | 6/2003 | Baratti et al. |
| 6,633,835 B1 | 10/2003 | Moran et al. |
| 6,732,289 B1 | 5/2004 | Talagala et al. |
| 6,745,287 B2 | 6/2004 | Fujimoto et al. |
| 6,766,359 B1 | 7/2004 | Oliveira et al. |
| 6,772,306 B2 | 8/2004 | Suzuki et al. |
| 6,789,112 B1 | 9/2004 | Freeman et al. |
| 6,801,940 B1 | 10/2004 | Moran et al. |
| 6,801,983 B2 | 10/2004 | Abe et al. |
| 6,851,020 B2 | 2/2005 | Matsumoto et al. |
| 6,874,100 B2 | 3/2005 | Rauscher |
| 2001/0004754 A1 | 6/2001 | Murayama et al. |
| 2001/0049717 A1 | 12/2001 | Freeman et al. |
| 2002/0069172 A1 | 6/2002 | Omshehe et al. |
| 2002/0120884 A1* | 8/2002 | Nakamikawa et al. ........ 714/31 |
| 2002/0124140 A1 | 9/2002 | Kawaguchi et al. |
| 2002/0188704 A1 | 12/2002 | Gold et al. |
| 2003/0018927 A1 | 1/2003 | Gadir et al. |
| 2003/0037275 A1* | 2/2003 | Bakke et al. .................. 714/4 |
| 2003/0037278 A1 | 2/2003 | Olarig |
| 2003/0084306 A1 | 5/2003 | Abburi et al. |
| 2003/0135782 A1* | 7/2003 | Matsunami et al. ........... 714/5 |
| 2003/0163712 A1 | 8/2003 | LaMothe et al. |
| 2003/0204597 A1 | 10/2003 | Arakawa et al. |
| 2004/0049710 A1 | 3/2004 | Ashmore et al. |
| 2004/0054930 A1 | 3/2004 | Walker et al. |
| 2004/0098348 A1 | 5/2004 | Kawasaki et al. |
| 2004/0133634 A1 | 7/2004 | Luke |
| 2004/0153416 A1 | 8/2004 | Fujimoto |
| 2004/0153740 A1 | 8/2004 | Fujimoto |
| 2004/0153914 A1 | 8/2004 | El-Batal |

* cited by examiner

PHYSICAL DISK MANAGEMENT TABLE

162a

| DISK NUMBER | CAPACITY | RAID | STATUS OF USE |
|---|---|---|---|
| #001 | 100GB | 5 | IN USE |
| #002 | 100GB | 5 | IN USE |
| #003 | 100GB | 5 | IN USE |
| #004 | 100GB | 5 | IN USE |
| #005 | 100GB | 5 | IN USE |
| #006 | 50GB | — | UNUSED |
| ⋮ | ⋮ | ⋮ | ⋮ |

LU MANAGEMENT TABLE

162b

| LU NUMBER | PHYSICAL DISK | CAPACITY | RAID |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

730 META-DATA

| FILENAME | TOP ADDRESS | CAPACITY | OWNER | UPDATE TIME |
|---|---|---|---|---|
| A | 7BSA | 200MB | X | 0 : 00 |
| B | 05BF | 50MB | X | 7 : 57 |
| C | 1F30 | 100MB | Y | 9 : 15 |
| D | 470B | 100MB | Z | 15 : 20 |
| ⋮ | ⋮ | ⋮ | ⋮ | ⋮ |

FIG. 14

DATA STRUCTURE OF DUMP INFORMATION

1400

| ITEM | START ADDRESS (byte) | SPECIFIC EXAMPLE OF CONTENT |
|---|---|---|
| NAS NUMBER | 0 | 1 |
| NETWORK ADDRESS | 32 | 192.168.0.10 |
| DUMP GENERATION TIME | 8 | 2003/01/11 03:45:11 |
| DUMP DATA | 128 | 0F15A0022811···· |

FIG. 15

STORAGE REGION (PARTITION) MANAGEMENT TABLE

1500

| STORAGE REGION (PARTITION ID) | DUMP INFORMATION | NAS ID | DUMP GENERATION TIME |
|---|---|---|---|
| 1 | PRESENT | 5 | 2003/01/11 03:45:11 |
| 2 | ABSENT | — | — |
| 3 | PRESENT | 1 | 2003/01/5 06:35:52 |
| 4 | ABSENT | — | — |

FIG. 17

DATA FORMAT OF MESSAGE

| ITEM | CONTENT (EXAMPLE) |
|---|---|
| FAILED NAS IDENTIFIER | 1 |
| NETWORK ADDRESS | 192.168.0.10 |
| FAILURE OCCURRENCE TIME | 2003/01/11 03 : 45 : 11 |
| DUMP INFORMATION STORAGE LU | #1 |
| STORAGE REGION (PARTITION ID) | 1 |
| FAILURE OCCURRENCE FACTOR | OS |

NOTICE DESTINATION TABLE  2200

| NOTICE DESTINATION (IP ADDRESS) | DEVICE TYPE |
|---|---|
| 192.168.2.1 | MANAGEMENT TERMINAL |
| 192.168.2.11 | CHANNEL CONTROL PORTION |
| 192.168.2.12 | CHANNEL CONTROL PORTION |
| 192.168.2.13 | CHANNEL CONTROL PORTION |
| ⋮ | ⋮ |

FIG. 23

FAILURE NOTICE SCREEN  2300

| CHANNEL CONTROL PORTION ID | STATUS | NOTICE SOURCE |
|---|---|---|
| 1 | FAILED | 192.168.0.10 |
| 2 | NORMAL | |
| 3 | NORMAL | |
| 4 | NORMAL | |
| 5 | NORMAL | |
| 6 | NORMAL | |
| 7 | NORMAL | |
| 8 | NORMAL | |

EXAMPLE OF NOTICE OF DATA SENT BY
E-MAIL OR THE LIKE

| ITEM | CONTENT (EXAMPLE) |
|---|---|
| FAILED NAS IDENTIFIER | 1 |
| NETWORK ADDRESS | 192.168.0.10 |
| FAILURE OCCURRENCE TIME | 2003/01/11 03:45:11 |
| DUMP INFORMATION STORAGE LU | LU1 |
| STORAGE REGION (PARTITION ID) | 1 |

WEB PAGE ON WHICH CONTENTS OF FAILURE ARE WRITTEN

| FAILED NAS NAME | FAILURE OCCURRENCE TIME | FAILURE CONTENT |
|---|---|---|
| NAS 1 | 2002/11/30 19:30:04 | NAS OS FAILURE |
| NAS 4 | 2002/11/28 00:14:48 | NAS OS FAILURE |

METHOD FOR CONTROLLING STORAGE SYSTEM

CROSS REFERENCE TO RELATED APPLICATIONS

This application is a continuation of U.S. application Ser. No. 10/651,559 filed Aug. 29, 2003 (now U.S. Pat. No. 7,024,595) and relates to U.S. patent applications Ser. No. 10/649,100 (now U.S. Pat. No. 7,203,862) and Ser. No. 10/651,536 filed claiming priority under 35 U.S.C. 119 of Japanese Patent Application Nos. 2003-025074 and 2003-025075, respectively, the disclosures of which are incorporated herein by reference.

BACKGROUND OF THE INVENTION

The quantity of data used in a computer system has increased rapidly in recent years. As a storage system for managing such data, a large-scale storage system managed by a RAID (Redundant Arrays of Inexpensive Disks) method for providing huge storage resources as called mid-range class or enterprise class has attracted public attention recently. To use and manage such huge data efficiently, there has been developed a technique for connecting a storage system such as a disk array system to information processors by a private network (Storage Area Network, hereinafter referred to as SAN) to thereby achieve high-speed and large-volume access to the storage system (e.g., see U.S. Pat. No. 5,815,652).

On the other hand, a storage system called NAS (Network Attached Storage) has been developed so that the storage system is connected to each information processor through a network using a protocol such as TCP/IP (Transmission Control Protocol/Internet Protocol) to achieve access at file level from the information processor.

SUMMARY OF THE INVENTION

When some failure occurs in a storage system using a huge volume of data to result in service stop, the user suffers a great deal of loss. For this reason, high availability is required of the storage system. To satisfy the demand for high availability, the storage system needs to have such a mechanism of efficient failure management that occurrence of failure is detected steadily and reported to the user, the operator, etc. rapidly so that work such as pursuit of the cause of failure, restoration, etc. can be hastened smoothly.

The invention is developed in consideration of the aforementioned problem and an object of the invention is to provide a storage system controlling method, a storage system and a program.

To achieve the foregoing object, in accordance with a main aspect of the invention, there is provided a method of controlling a storage system, wherein:

the storage system includes: channel control portions each including a circuit board on which a file access processing portion for receiving file-by-file data input/output requests sent from information processors through a network and an I/O processor for outputting I/O requests corresponding to the data input/output requests to storage devices are formed; disk control portions for performing data input/output of the storage devices in response to the I/O requests sent from the I/O processors; and a computer communicatably connected to the channel control portions and the disk control portions; and when one of the channel control portions detects occurrence of failure in the channel control portion, the channel control portion gives a notice of occurrence of failure to the computer.

Incidentally, the information processors are, for example, personal computers or main frame computers that can access the storage system configured as described above through an LAN or an SAN. The function of each file access processing portion is provided by an operating system executed on a CPU and a software such as NFS (Network File System) or the like operating on the operating system. The storage devices are disk drives such as hard disk devices or the like. For example, each I/O processor includes an IC (Integrated Circuit) as a hardware element independent of the CPU as a hardware element of the file access processing portion. The I/O processor controls communications between the file access processing portion and the disk control portions. The disk control portions write/read data in/from the storage devices.

BRIEF DESCRIPTION OF THE DRAWINGS

FIG. 14 is a view showing an example of data format of dump information in this embodiment;

FIG. 15 is a view showing an example of a storage region management table in this embodiment;

FIG. 17 is a view showing an example of data format of a message indicating a notice of occurrence of failure in this embodiment;

FIG. 22 is a view showing an example of a notice destination table in this embodiment;

FIG. 23 is a view showing an example of a failure notification screen in this embodiment;

FIG. 24 is a view showing an example of the content of data sent as a notice from an NAS manager to an information processor or the management terminal by e-mail or the like in this embodiment;

FIG. 25 is a view showing an example of a Web page generated by an NAS manager in this embodiment;

DETAILED DESCRIPTION OF THE EMBODIMENTS

Example of Overall Configuration

Figure 1:
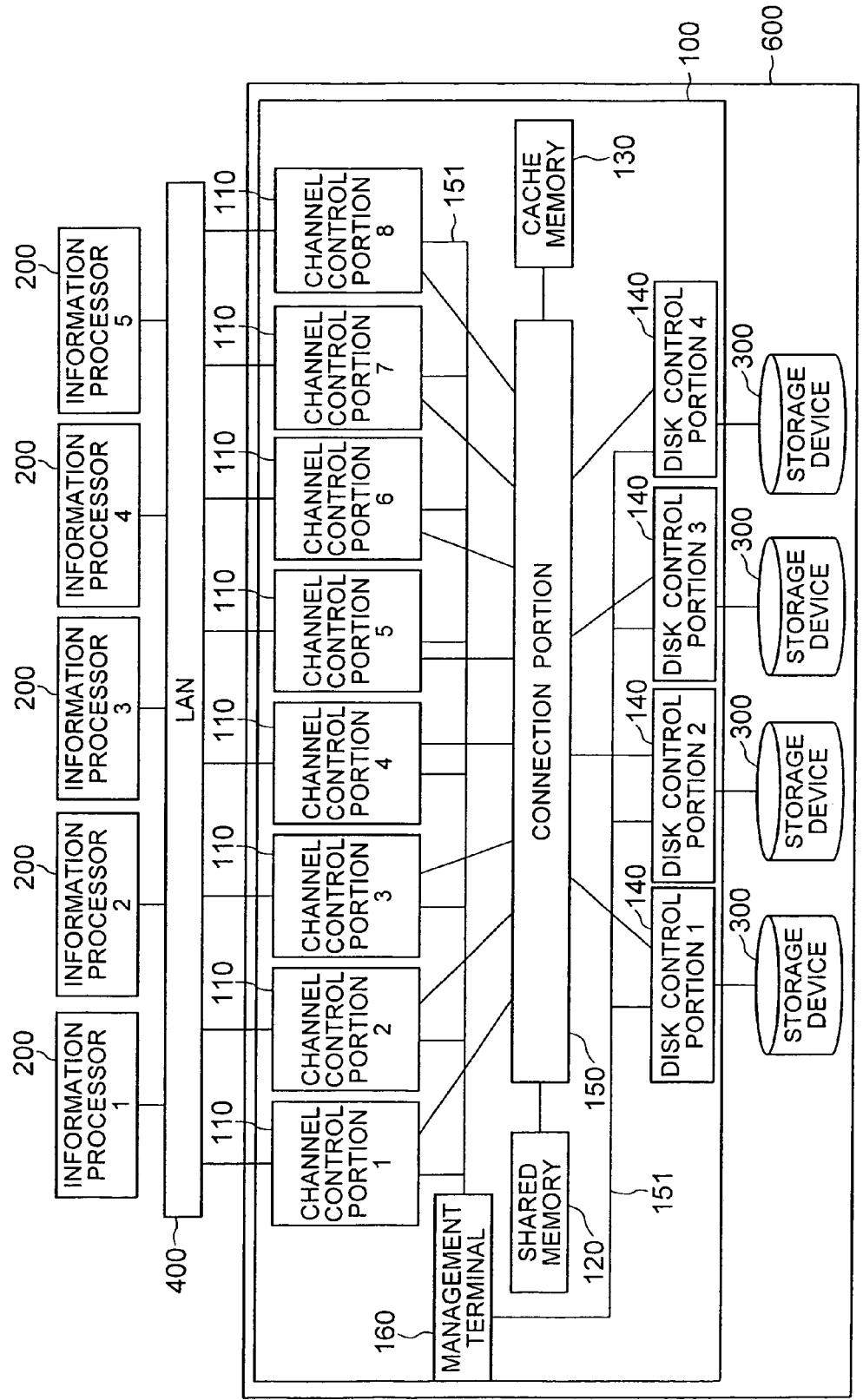
FIG. 1 is a block diagram showing the overall configuration of a storage system according to an embodiment of the invention.

A storage system 600 includes a storage device controller 100, and storage devices (storage units) 300. The storage device controller 100 controls the storage devices 300 according to commands received from information processors 200. For example, upon reception of a data input/output request from a certain information processor 200, the storage device controller 100 performs processing for input/output of data stored in the storage devices 300. Data are stored in logical volumes (logical units) (hereinafter referred to as LUs) which are storage regions logically set on physical storage regions provided by disk drives contained in the storage devices 300. The storage device controller 100 exchanges various kinds of commands with the information processors 200 for managing the storage system 600.

Each of the information processors 200 is a computer that contains a CPU (Central Processing Unit), and a memory. The CPU contained in each information processor 200 executes various kinds of programs to implement various functions. For example, each information processor 200 may be a personal computer, a work station or a main frame computer.

In FIG. 1, the information processors 200 are connected to the storage device controller 100 through an external LAN (Local Area Network) 400 which is an external network. The external LAN 400 may be replaced by the Internet or by a private network. Communications between the information processors 200 and the storage device controller 100 through the external LAN 400 are performed, for example, according to TCP/IP. The information processors 200 send requests for data access based on designated filenames (hereinafter referred to as file access requests) to the storage system 600.

The storage device controller 100 has channel control portions 110. The channel control portions 110 are hereinafter also referred to as CHNs. The storage device controller 100 uses the channel control portions 110 to communicate with the information processors 200 through the external LAN 400. The channel control portions 110 individually accept file access requests from the information processors 200. That is, network addresses (e.g., IP addresses) on the external LAN 400 are assigned to the channel control portions 110 respectively. Accordingly, the channel control portions 110 can serve as NASs respectively, so that the channel control portions 110 can provide NAS service to the information processors 200 as if the respective NASs were present as independent NASs. Because one storage system 600 is configured to include the channel control portions 110 for providing NAS service individually in the aforementioned manner, NAS servers that were heretofore operated by independent computers respectively can be collectively operated by a single storage system 600. This configuration permits the storage system 600 to perform general management, so that improvement in efficiency of maintenance transactions such as various kinds of setting/control, failure management and version management can be attained.

Incidentally, the function of each of the channel control portions 110 in the storage device controller 100 according to this embodiment is implemented by a hardware formed on a circuit board integrated as a unit, an operating system (hereinafter referred to as OS) executed by the hardware and a software such as an application program operated on the OS etc., as will be described later. In this manner, in the storage system 600 according to this embodiment, the function which has been heretofore provided as part of hardware is mainly implemented by software. For this reason, in the storage system 600 according to this embodiment, flexible system operation can be conducted to make it possible to provide delicate service meeting diversified and varied users' needs.

(Storage Devices)

The storage devices 300 have a large number of disk drives (physical disks) to provide storage regions to the information processors 200. Data are stored in LUs which are storage regions logically set on physical storage regions provided by the disk drives. As the disk drives, various devices such as hard disk devices, flexible disk devices, semiconductor storage devices, etc. can be used.

Incidentally, for example, the storage devices 300 may be used in such a manner that a disk array is constituted by a plurality of disk drives. In this case, the storage regions provided to the information processors 200 may be provided by a plurality of disk drives managed by RAID.

The storage devices 300 may be connected to the storage device controller 100 directly as shown in FIG. 1 or may be connected to the storage device controller 100 through a network. The storage devices 300 may be also integrated with the storage device controller 100.

The LUs set in the storage devices 300 include user LUs allowed to be accessed by the information processors 200, and system LUs used for control of the channel control portions 110. Each system LU also stores an operating system executed by a corresponding CHN 110. The channel control portions 110 are associated with LUs respectively. Accordingly, LUs are assigned to the channel control portions 110 so that the LUs can be accessed by the channel control portions 110 respectively. The association may be also made so that one LU is used in common with a plurality of channel control portions 110. Incidentally, the user LUs and the system LUs are hereinafter also referred to as user disks and system disks. The LU used in common with a plurality of channel control portions 110 is hereinafter referred to as shared LU or shared disk.

(Storage Device Controller)

The storage device controller 100 includes channel control portions 110, a shared memory 120, a cache memory 130, disk control portions 140, a management terminal 160, and a connection portion 150.

Each channel control portion 110 has a communication interface for communicating with the information processors 200. That is, each channel control portion 110 has a function for exchanging data input/output commands with the information processors 200. For example, a CHN 110 accepts file access requests from the information processors 200. The CHN 110 calculates storage addresses, data lengths, etc. of files and outputs I/O requests corresponding to the file access requests to thereby access the storage devices 300. In this manner, the storage system 600 can provide NAS service to the information processors 200. Incidentally, each I/O request contains a data top address, a data length, and an access type such as read or write. In the case of data write, data to be written may be contained in the I/O request. The I/O request is output from an I/O processor 119 that will be described later.

The channel control portions 110 and the management terminal (system control terminal) 160 are connected to one another through an internal LAN 151 which is a network inside the storage system 600. Accordingly, micro-programs etc. to be executed by the channel control portions 110 can be sent and installed from the management terminal 160. The configuration of each cannel control portion 110 will be described later.

The connection portion 150 connects the channel control portions 110, the shared memory 120, the cache memory 130 and the disk control portions 140 to one another. Exchange of data and commands among the channel control portions 110, the shared memory 120, the cache memory 130 and the disk control portions 140 is conducted through the connection portion 150. The connection portion 150 is a high-speed bus such as an ultra high-speed crossbar switch for performing data transmission by high-speed switching. Because the channel control portions 110 are connected to one another by the high-speed bus, performance of communications between the channel control portions 110 is improved greatly compared with a conventional configuration in which NAS servers operated on computers respectively are connected to one another through an LAN. In addition, the use of the high-speed bus makes a high-speed file sharing function, a high-speed fail-over function, etc., possible.

The shared memory 120 and the cache memory 130 are storage memories used in common with the channel control portions 110 and the disk control portions 140. The shared memory 120 is mainly used for storing control information, commands, etc. whereas the cache memory 130 is mainly used for storing data.

When, for example, the data input/output command received by a certain channel control portion 110 from a certain information processor 200 is a write command, the channel control portion 110 writes the write command in the shared memory 120 and further writes write data received from the information processor 200 in the cache memory 130. On the other hand, each disk control portion 140 monitors the shared memory 120. When a pertinent disk control portion 140 detects that the write command has been written in the shared memory 120, the disk control portion 140 reads the write data from the cache memory 130 and writes the write data in a pertinent storage device 300 in accordance with the command.

In addition, when the data input/output command received by a certain channel control portion 110 from a certain information processor 200 is a read command, the channel control portion 110 writes the read command in the shared memory 120 and checks whether data to be read is present in the cache memory 130 or not. When the data is present in the cache memory 130, the data is sent to the information processor 200. On the other hand, when the data to be read is not present in the cache memory 130, the disk control portion 140 monitoring the shared memory 120 so as to detect the writing of the read command in the shared memory 120 reads data as a subject of reading from a pertinent storage device 300, writes the data in the cache memory 130 and writes notification of the writing in the shared memory 120. When the channel control portion 110 monitors the shared memory 120 so as to detect the notification of the writing of the data as a subject of reading in the cache memory 130, the channel control portion 110 sends the data to the information processor 200.

Incidentally, as an alternative to the configuration in which instructions given from the channel control portions 110 to the disk control portions 140 to write or read data are conducted indirectly with intermediation of the shared memory 120 in this manner, there may be adopted, for example, another configuration in which instructions given from the channel control portions 110 to the disk control portions 140 to write or read data are conducted directly without intermediation of the shared memory 120.

The disk control portions 140 control the storage devices 300 respectively. For example, the channel control portions 110 write data in the storage devices 300 according to the data write commands received from the information processors 200 in the aforementioned manner. When a request of data access to an LU based on a designated logical address is sent from a certain channel control portion 110 to a corresponding disk control portion 140, the disk control portion 140 converts the data access request into a request of data access to a physical disk based on a designated physical address. In the case where the physical disks in the storage devices 300 are managed by RAID, data access is made according to the RAID configuration (e.g., RAID0, RAID1 or RAID5). The disk control portions 140 perform duplicating management control and backup control of data stored in the storage devices 300. In addition, the disk control portions 140 perform control (a replication function or a remote copying function) to store a replica of data of the storage system 600 on a primary site in the other storage system installed on a secondary site for the purpose of prevention of data destruction caused by occurrence of a disaster (disaster recovery), etc.

The disk control portions 140 and the management terminal 160 are connected to one another through the internal LAN 151 so as to be able to communicate with one other. Accordingly, micro-programs etc. to be executed by the disk control portions 140 can be sent and installed from the management terminal 160. The configuration of each disk control portion 140 will be described later.

(Management Terminal)

The management terminal 160 (system control terminal) is a computer for maintaining and managing the storage system 600, monitoring the operating state, execution state and occurrence of failure in hardware and software in the storage system 600, and so on. When the management terminal 160 is operated, for example, setting of physical disk configuration in the storage devices 300, setting of LUs, installation of micro-programs to be executed by the channel control portions 110, etc. can be conducted. As the setting of physical disk configuration in the storage devices 300, for example, increase or decrease in the number of physical disks, change in RAID configuration (e.g., change from RAID1 to RAID5), etc. may be made. Further, operations such as checking the operating state of the storage system 600, specifying a failure portion, installing an operating system to be executed by each channel control portion 110, etc. may be also made by the management terminal 160. The management terminal 160 may be also connected to an external maintenance center through an LAN, a telephone line or the like so that failure in the storage system 600 can be monitored by use of the management terminal 160 and that measures against failure can be taken speedily when failure occurs. Notice of occurrence of failure is given, for example, from an OS 701, an application program, a driver software, etc. operating in each channel control portion. This notice is made by an HTTP (HyperText Transport Protocol), an SNMP (Smile Network Management Protocol), an e-mail, etc. The setting and control may be made by an operator or the like while a Web page provided by a Web server operated by the management terminal 160 is used as a user interface. The operator or the like may perform setting of a subject or content of failure monitoring, setting of a failure notice destination, etc. by operating the management terminal 160.

The management terminal 160 may be built in the storage device controller 100 or may be externally attached to the storage device controller 100. The management terminal 160 may be provided as a computer exclusively used for maintenance and management of the storage device controller 100 and the storage devices 300 or may be provided as a general-purpose computer formed to have a maintenance and management function.

Figures 2, 3, 4:
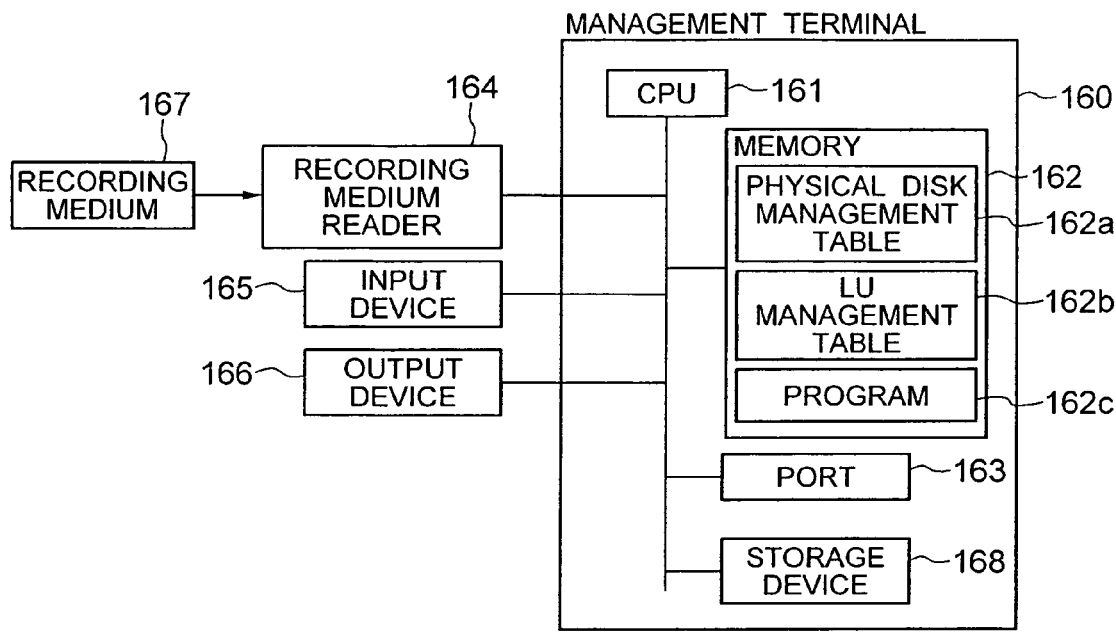
FIG. 2 is a block diagram showing the configuration of a management terminal in this embodiment.
FIG. 3 is a view showing a physical disk management table in this embodiment.
FIG. 4 is a view showing an LU management table in this embodiment.

FIG. 2 is a block diagram showing the configuration of the management terminal 160.

The management terminal 160 includes a CPU 161, a memory 162, a port 163, a recording medium reader 164, an input device 165, an output device 166, and a storage device 168. The CPU 161 has charge of general control of the management terminal 160. When the CPU 161 executes a program 162c stored in the memory 162, the function of a Web server as described above, or the like, can be implemented. The memory 162 stores a physical disk management table 162a and an LU management table 162b as well as the program 162c. The physical disk management table 162a is a table for managing the physical disks (disk drives) contained in the storage devices 300. FIG. 3 shows the physical disk management table 162a. Of a large number of physical disks contained in the storage devices 300, disk numbers #001 to #006 are shown in FIG. 3. The capacity, RAID configuration and status of use are shown for each physical disk.

The LU management table 162b is a table for managing the LUs logically set on the physical disks. FIG. 4 shows the LU management table 162b. Of a large number of LUs set on the storage devices 300, LU numbers #1 to #3 are shown in FIG. 4. The physical disk number, capacity and RAID configuration are shown for each LU.

The recording medium reader 164 is a device for reading programs and data recorded in a recording medium 167. The programs and data read thus are stored in the memory 162 or the storage device 168. Accordingly, for example, a program 162c recorded in the recording medium 167 can be read from the recording medium 167 by the recording medium reader 164 and stored in the memory 162 or the storage device 168. Incidentally, examples of the program recorded in the recording medium 167 are a program for functionally operating the management terminal 160, and a program for installing or version upgrading an OS or application program in each channel control portion 110. A flexible disk, a CD-ROM, a DVD-ROM, a DVD-RAM, a semiconductor memory, or the like, may be used as the recording medium 167. Incidentally, the program 162c can be used as a program for operating the management terminal 160 and can be used also as a program for installing an OS 701 or an application program in each channel control portion 110 or each disk control portion 140 or as a program for upgrading the version of the OS 701 or the application program. The recording medium reader 164 may be built in the management terminal 160 or may be externally attached to the management terminal 160. The storage device 168 is, for example, a hard disk device, a flexible disk device, a semiconductor storage device, etc. The input device 165 is used for inputting data into the management terminal 160 by an operator or the like. For example, a keyboard, a mouse, or the like is used as the input device 165. The output device 166 is a device for outputting information to the outside. For example, a display, a printer, or the like, is used as the output device 166. The port 163 is connected to the internal LAN 151, so that the management terminal 160 can communicate with the channel control portions 110, the disk control portions 140, etc. through the port 163. The port 163 may be also connected to the external LAN 400 which is an external network, or may be connected to the telephone line.

(External Appearance View)

Figure 5:
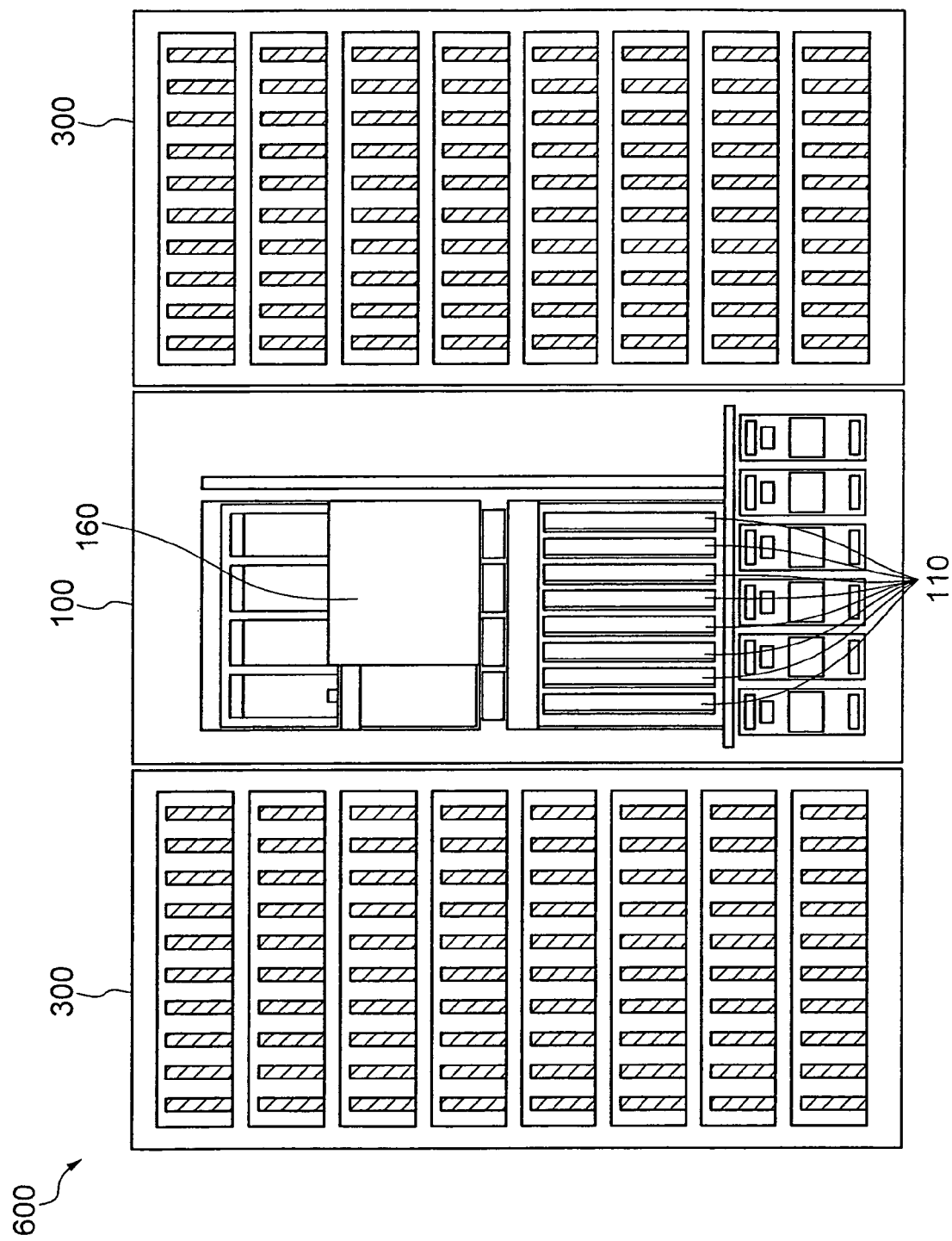
FIG. 5 is a view showing the external appearance configuration of the storage system in this embodiment.
Figure 6:
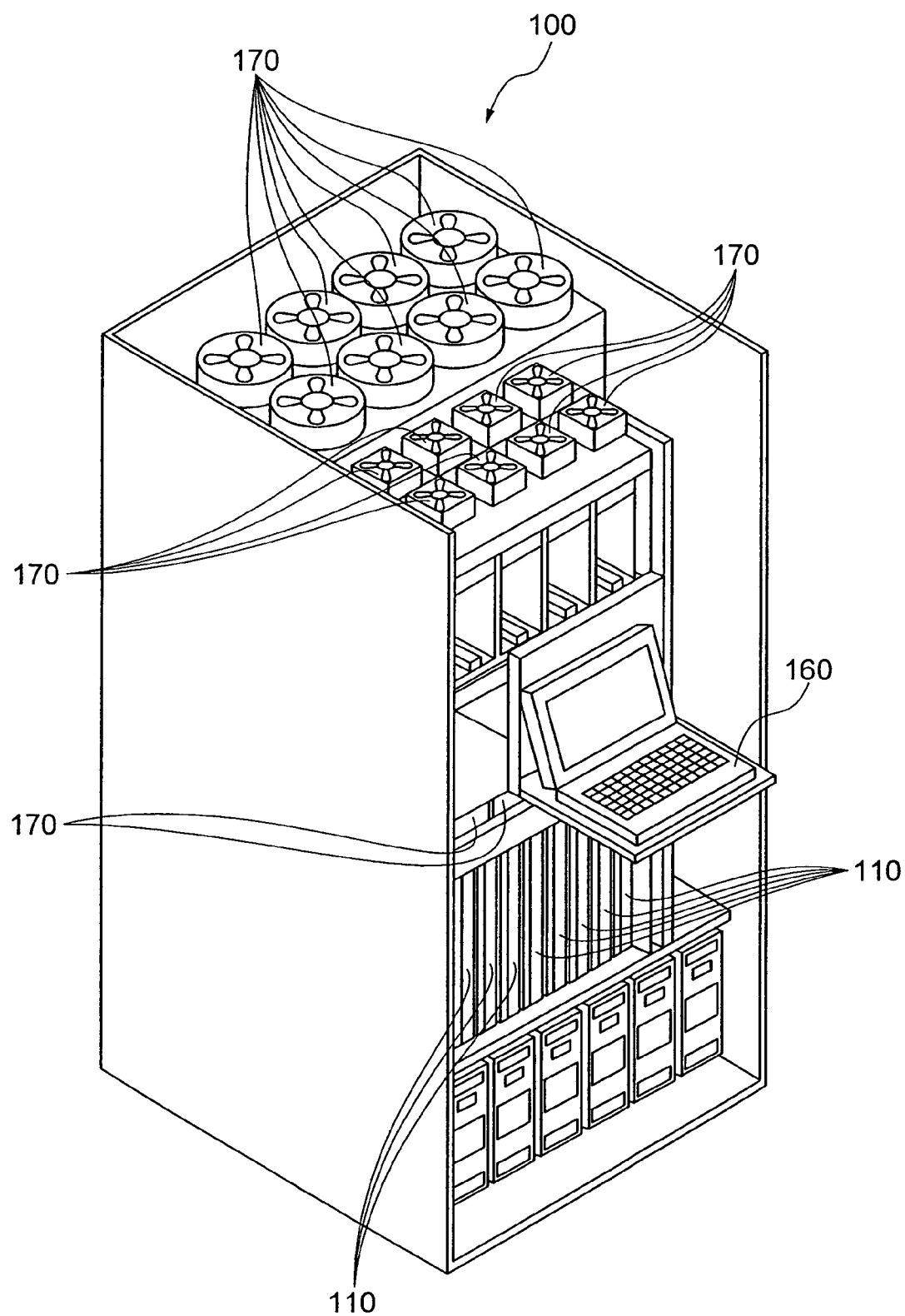
FIG. 6 is a view showing the external appearance configuration of a storage device controller in this embodiment.

FIG. 5 shows the external appearance configuration of the storage system 600 according to this embodiment. FIG. 6 shows the external appearance configuration of the storage device controller 100.

As shown in FIG. 5, the storage system 600 according to this embodiment is formed so that the storage device controller 100 and the storage devices 300 are stored in respective casings. The casings of the storage devices 300 are disposed on opposite sides of the casing of the storage device controller 100.

The storage device controller 100 has the management terminal 160 in its front center portion. The management terminal 160 is closed with a cover. When the cover is opened as shown in FIG. 6, the management terminal 160 can be used. Although the management terminal 160 shown in FIG. 6 is shaped like a so-called notebook type personal computer, any shape may be used.

Slots for attaching boards of the channel control portions 110 are provided below the management terminal 160. The boards of the channel control portions 110 are units in which circuit boards of the channel control portions 110 are formed respectively and which are attached to the slots respectively. In the storage system 600 according to this embodiment, eight slots are prepared. FIGS. 5 and 6 show a state in which boards each mounted with a circuit constituting hardware of a channel control portion 110 are attached into the eight slots respectively. A guide rail is provided in each slot so that the board of the channel control portion 110 can be attached into the slot through the guide rail. When the boards of the channel control portions 110 are inserted into the slots along the guide rails respectively, the boards of the channel control portions 110 can be mounted on the storage device controller 100. When the board of the channel control portion 110 which has been attached into each slot is drawn out forward along the guide rail, the board of the channel control portion 110 can be removed. A connector is provided in a front portion on a deep side of each slot so that the board of each channel control portion 110 can be electrically connected to the storage device controller 100 by the connector.

Channel control portions 110 of the type having a function for connection to an SAN (Storage Area Network) and channel control portions 110 of the type having a function for performing communications in accordance with a main frame type protocol such as FICON (Fibre Connection) (registered trademark), ESCON (Enterprise System Connection) (registered trademark), or the like, as well as channel control portions 110 of the type functioning as an NAS described above, may be attached into the slots. Further, some slots may be provided as empty slots in a state that the boards of the channel control portions 110 have not been attached into the slots yet.

Figure 12:
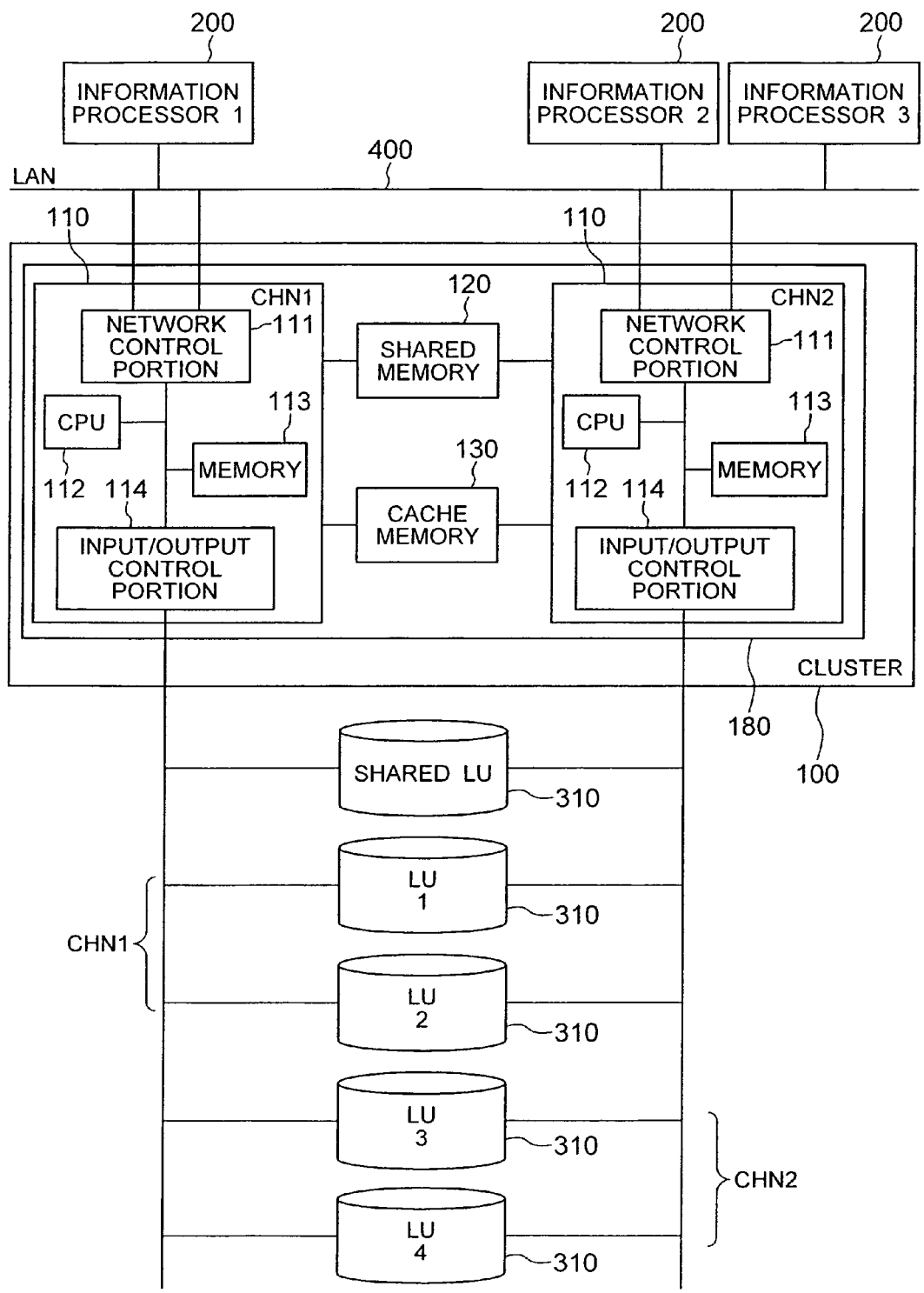
FIG. 12 is a block diagram for explaining exclusive control and fail-over control in this embodiment.

In the channel control portions 110 attached into the slots, each cluster is constituted by the same kind of channel control portions 110. For example, a pair of CHNs 110 may form a cluster. When clusters are formed, even in the case where failure occurs in a certain channel control portion 110 in a certain cluster, processing that has been executed by the failed channel control portion 110 until then can be handed over to the other channel control portion 110 in the cluster (fail-over control). FIG. 12 is a view showing a state in which a pair of CHNs 110 form a cluster. The cluster will be described later in detail.

Incidentally, in the storage device controller 100, two power supply systems are provided for improvement in reliability. The eight slots into which the boards of the channel control portions 110 are attached are divided into four and four by the two power supply systems. Therefore, when clusters are formed, each of the clusters contains boards of the channel control portions 110 belonging to the two power supply systems respectively. As a result, even in the case where failure occurs in one power supply system so that power supply stops, power supply to the board of the channel control portion 110 belonging to the other power supply system in the same cluster is continued so that processing can be handed over to the channel control portion 110 (fail-over).

Incidentally, as described above, each channel control portion 110 is provided as a board that can be attached into each slot. One board may be composed of a plurality of circuit boards integrated into one body.

Though not shown in FIGS. 5 and 6, other devices such as the disk control portions 140, the shared memory 120, etc. for forming the storage device controller 100 are attached to the back, or the like, of the storage device controller 100.

Fans 170 for radiating heat generated in the boards of the channel control portions 110, etc. are provided in the storage device controller 100. The fans 170 are provided on a top portion of the storage device controller 100 and on an upper portion of the slots for the channel control portions 110.

Incidentally, for example, conventional devices commercialized to support the SAN can be used as the storage device controller 100 and the storage devices 300 configured to be packed in casings. Particularly when the shape of the connector provided in the board of each CHN 110 is formed so as to be able to be directly attached into a slot provided in a conventional casing as described above, conventional devices can be used more easily. That is, the storage system 600 according to this embodiment can be constructed easily when existing products are used.

(Channel Control Portion)

In the storage system 600 according to this embodiment, as described above, each CHN 110 accepts a file access request from a certain information processor 200 and provides NAS service to the information processor 200.

Figure 7:
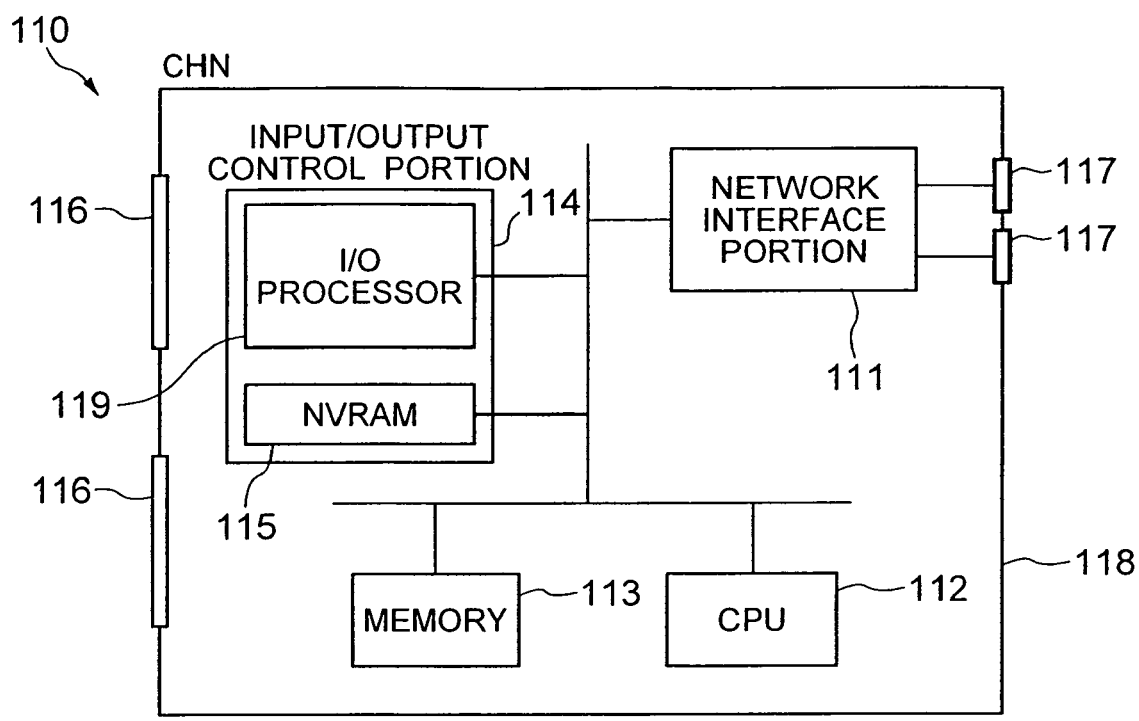
FIG. 7 is a diagram showing the hardware configuration of a channel control portion in this embodiment.

FIG. 7 shows the hardware configuration of a CHN 110. As shown in FIG. 7, the hardware of the CHN 110 is constituted by a board integrated as a unit. This unit is hereinafter also referred to as NAS board. The NAS board may be composed of a circuit board or of a plurality of circuit boards. More specifically, the NAS board includes a network interface portion 111, a CPU 112, a memory 113, an input/output control portion 114 (having an I/O (Input/Output) processor 119, and an NVRAM (Non-Volatile RAM) 115), board connection connectors 116, and communication connectors 117. The NAS board is formed and configured as a circuit board having these parts integrated into one unit.

The network interface portion 111 has a communication interface for communicating with the information processors 200. Through the network interface portion 111, the CHN 110 receives a file access request sent from a certain information processor 200, for example, according to TCP/IP. The communication connectors 117 are connectors used for communicating with the information processors 200. In the case of the CHN 110, the communication connectors 117 are connectors that can be connected to the external LAN 400, for example, to support Ethernet (registered trademark).

The CPU 112 has charge of control for making the CHN 110 function as an NAS board.

Figure 8:
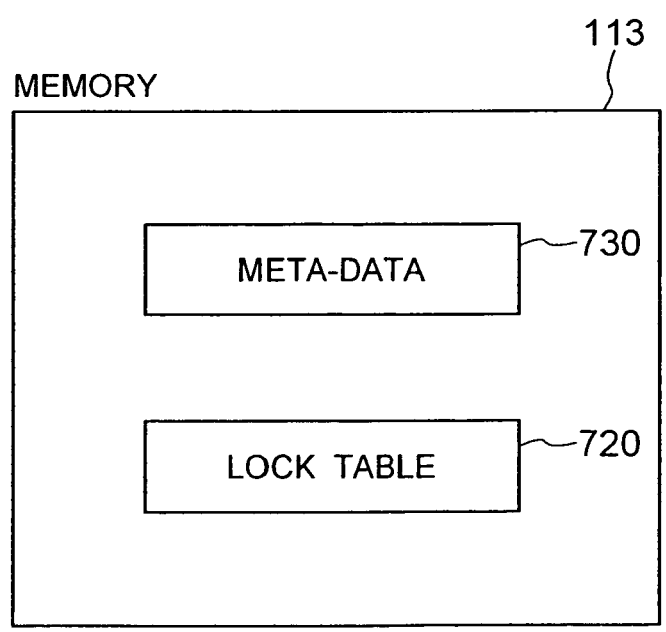
FIG. 8 is a diagram for explaining the content of data stored in a memory in this embodiment.
Figure 11:
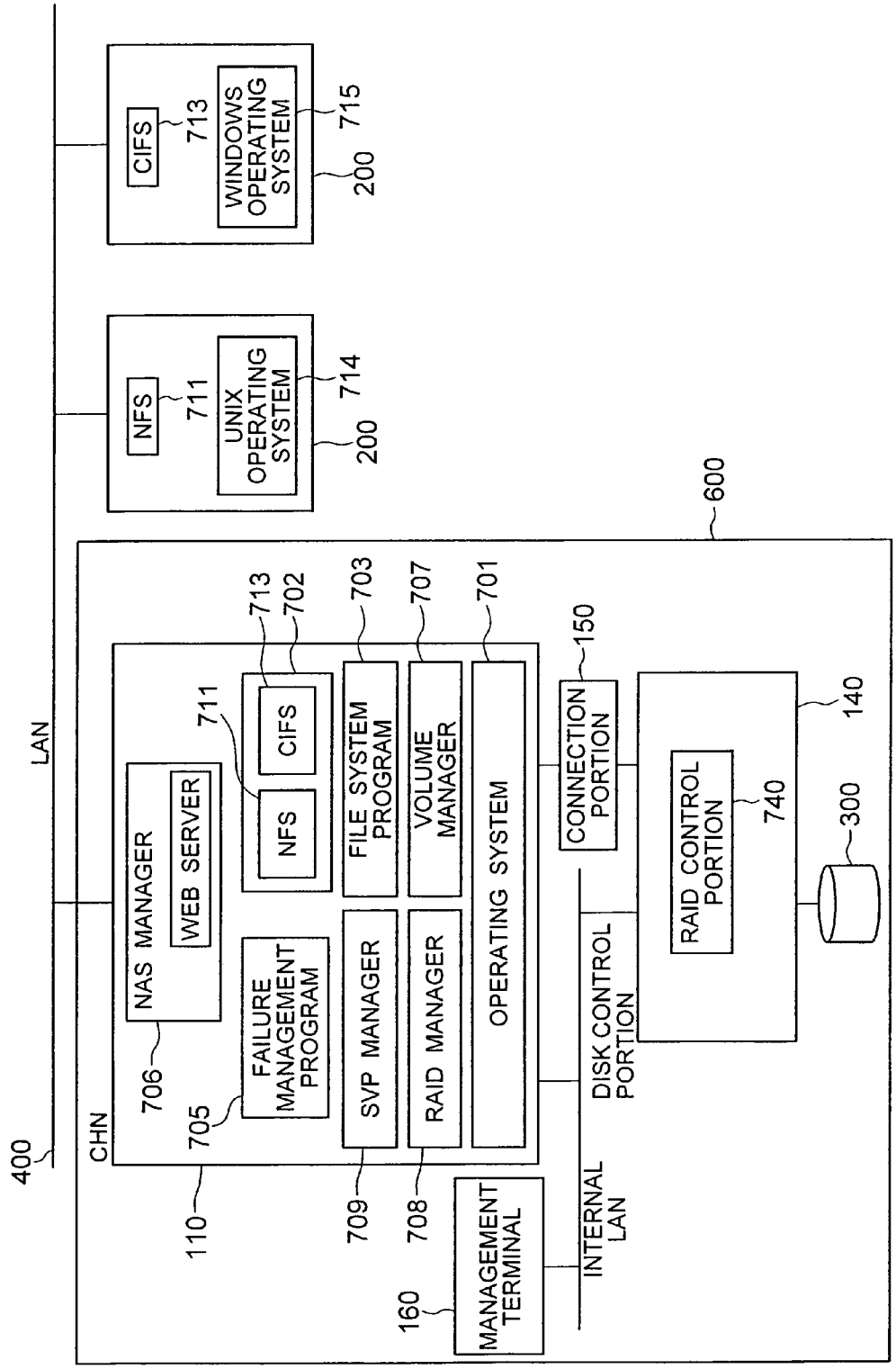
FIG. 11 is a diagram showing the software configuration of the storage system in this embodiment.

Various programs and data are stored in the memory 113. For example, meta-data 730 and a lock table 720 shown in FIG. 8 or various kinds of programs such as an NAS manager 706 etc. shown in FIG. 11 are stored in the memory 113.

Figures 9, 10:
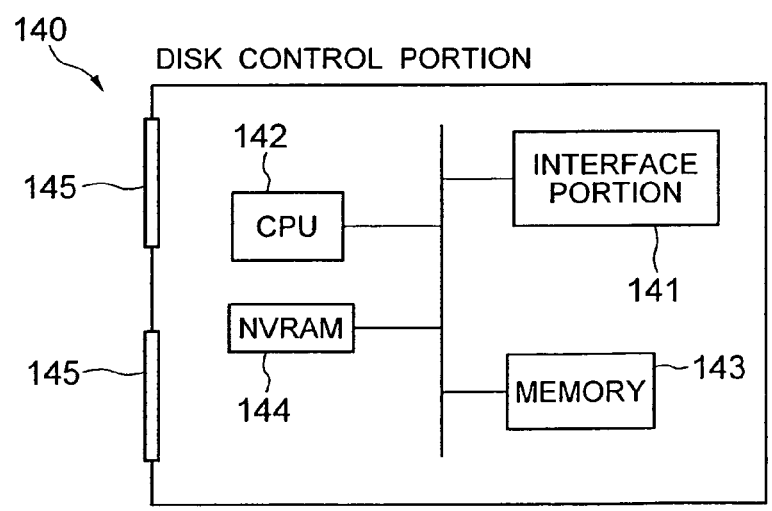
FIG. 9 is a view showing an example of meta-data in this embodiment.
FIG. 10 is a diagram showing the hardware configuration of a disk control portion in this embodiment.

FIG. 9 shows an example of the meta-data 730. The meta-data 730 is information generated in correspondence with files managed by a file system provided by a file system program 703. The meta-data 730 contains information for specifying file archiving places, such as addresses on LUs in which data of files are stored, data sizes, etc. The meta-data 730 may further contain information concerning file capacity, owner, update time, etc. The meta-data 730 may be generated in correspondence with directories instead of files. The meta-data 730 is also stored in each of LUs on the storage devices 300.

The input/output control portion 114 exchanges data and commands with the disk control portions 140, the cache memory 130, the shared memory 120 and the management terminal 160. The input/output control portion 114 has an I/O processor 119, and an NVRAM 115. For example, the I/O processor 119 is constituted by a one-chip microcomputer. The I/O processor 119 controls the exchange of data and commands and relays communications between the CPU 112 and the disk control portions 140. The NVRAM 115 is a non-volatile memory that stores programs taking charge of control of the I/O processor 119. The contents of the programs stored in the NVRAM 115 can be written or rewritten in accordance with instructions given from the management terminal 160 or the NAS manager 706 that will be described later.

FIG. 10 is a diagram showing the hardware configuration of each disk control portion 140.

Each disk control portion 140 is formed as a board integrated as a unit. The board of the disk control portion 140 includes an interface portion 141, a memory 143, a CPU 142, an NVRAM 144, and board connection connectors 145. The board is formed as a circuit board having these parts integrated into one unit.

The interface portion 141 has a communication interface for communicating with the channel control portions 110, etc. through the connection portion 150, and a communication interface for communicating with the storage devices 300.

The CPU 142 has charge of general control of the disk control portion 140 and communicates with the channel control portions 110, the storage devices 300 and the management terminal 160. When various kinds of programs stored in the memory 143 or the NVRAM 144 are executed, the function of the disk control portion 140 according to this embodiment can be implemented. Examples of the function implemented by the disk control portion 140 are control of the storage devices 300, RAID control, duplication management and backup control of data stored in the storage devices 300, remote copy control, and so on.

The NVRAM 144 is a non-volatile memory for storing programs taking charge of control of the CPU 142. The contents of the programs stored in the NVRAM 144 can be written or rewritten in accordance with instructions given from the management terminal 160 or the NAS manager 706.

The board of the disk control portion 140 has board connection connectors 145. When a board connection connector 145 is fitted to a storage device controller 100 side connector, the board of the disk control portion 140 is electrically connected to the storage device controller 100.

(Software Configuration)

FIG. 11 is a diagram showing the software configuration of the storage system 600 according to this embodiment.

For example, the operating system 701 is UNIX (registered trademark). On the operating system 701, softwares such as an RAID manager 708, a volume manager 707, an SVP manager 709, a file system program 703, a network control portion 702, a failure management program 705, an NAS manager 706, etc. operate.

The RAID manager 708 operating on the operating system 701 provides a function for setting parameters for a RAID control portion 740 and controlling the RAID control portion 740. The RAID manager 708 accepts parameters and control instruction information from the operating system 701, another application operating on the operating system 701 or the management terminal 160 and performs setting of the accepted parameters for the RAID control portion 740 and transmission of control commands corresponding to the control instruction information to the RAID control portion 740.

Examples of the parameters set here are parameters for definitions (such as designation of configuration information of an RAID group, stripe size, etc.) of storage devices (physical disks) constituting an RAID group, parameters for setting an RAID level (such as RAID0, RAID1 or RAID5), and so on. Examples of the control commands sent from the RAID manager 708 to the RAID control portion 740 are commands for instructing configuration of RAID, deletion and capacity change, commands for requesting configuration information of each RAID group, and so on.

The volume manager 707 further virtualizes LUs provided by the RAID control portion 740 and provides the virtualized LUs as virtual logical volumes to the file system program 703. One virtual logical volume includes one or more logical volumes. Incidentally, the OS 701 and various kinds of application programs executed on the OS 701 may access the LUs directly and may access the virtual logical volumes.

The main function of the file system program 703 is to manage association of filenames designated by file access requests received by the network control portion 702, with addresses on LUs or virtual logical volumes storing the filenames. For example, the file system program 703 designates addresses on LUs or addresses on virtual logical volumes, corresponding to filenames designated by file access requests respectively.

The network control portion 702 includes two file system protocols of NFS (Network File System) 711 and CIFS (Common Interface File System) 713. The NFS 711 accepts file access requests from UNIX (registered trademark) information processors 200 in which the NFS 711 operates. On the other hand, the CIFS 713 accepts file access requests from Windows (registered trademark) information processors 200 in which the CIFS 713 operates.

The NAS manager 706 is a program for performing checking the operating state of the storage system 600, setting the storage system 600, controlling the storage system 600, and so on. The NAS manager 706 further has the function of a Web server for the information processors 200 connected to the external LAN 400 and provides a setting Web page to a pertinent information processor 200 so that the storage system 600 can be set and controlled on the information processor 200 side and that the operating state of the storage system 600 and occurrence of failure can be monitored from the information processor 200 side. The setting Web page is provided by the NAS manager 706 that operates in each of the channel control portions 110. In response to an HTTP (HyerText Transport Protocol) request from a certain information processor 200, the NAS manager 706 sends data for the setting Web page to the information processor 200. A system administrator or the like instructs setting and controlling of the storage system 600 by using the setting Web page displayed on the information processor 200.

Upon reception of data concerning setting and controlling sent from the information processor 200 in accordance with the operation on the setting Web page, the NAS manager 706 executes the setting and controlling corresponding to the data. In this manner, various setting and controlling of the storage system 600 can be performed on the information processor 200 side. The NAS manager 706 notifies the OS and the application program operating on the channel control portion 110, the disk control portion 140, etc. of the contents set on the setting Web page. The contents set on the setting Web page may be managed in a shared LU 310.

Examples of the contents set on the setting Web page provided by the NAS manager 706 are management and setting of LUs (management of capacity, extension or reduction of capacity, user allocation, etc.), setting and controlling concerning the aforementioned function such as duplication management and remote copy (replication) (setting of duplication source LU and duplication destination LU, etc.), cluster management of redundantly configured CHNs 110 (setting of correspondence relation to CHNs 110 to be failed over, fail-over method, etc.), and version management of the OS and application programs operating on the OS.

Incidentally, for checking of the operating state of the storage system 600 and setting and controlling of the storage system 600 by the NAS manager 706, a client server system may be used instead of the method using the aforementioned setting Web page. In this case, the NAS manager 706 has a server function of a client server system. Setting and controlling sent in accordance with the operation of a client function of the information processor 200 are carried out in the same manner as in the aforementioned setting Web page to thereby perform checking of the operating state of the storage system 600 and setting and controlling of the storage system 600.

The failure management program 705 is a program for performing fail-over control between channel control portions 110 that form a cluster.

FIG. 12 is a diagram showing a state in which two CHNs 110 form a cluster 180. In FIG. 12, there is shown the case where CHN1 (channel control portion 1) 110 and CHN2 (channel control portion 2) 110 form a cluster 180.

As described above, a fail-over process is carried out between the channel control portions 110 that form the cluster 180. That is, when, for example, some failure occurs in CHN1 (110) so that processing cannot be continued, the processing that has been executed by CHN1 (110) until then is handed over to CHN2 (110). The fail-over process is carried out by the failure management program 705 executed by CHN1 (110) and CHN2 (110).

Each of CHN1 (110) and CHN2 (110) executes the failure management program 705 and writes notice of normal processing executed by itself in the shared memory 120. Each confirms the written notice received from the other. When each cannot detect the notice written by the other, a fail-over process is carried out on the basis of the decision that some failure occurs in the other. Processing is handed over to the other CHN through the shared LU 310 when the fail-over process is carried out.

Fail-over may be carried out automatically in this manner or may be carried out manually in accordance with an instruction given by the operator operating the management terminal 160. Or fail-over may be carried out manually in accordance with an instruction given from the information processor 200 side by the user using the setting Web page provided by the NAS manager 706. For example, in the case where the hardware (e.g., NAS board) of a channel control portion 110 needs to be exchanged because of expiration of the durable period, upgrade of the version, periodic diagnosis, etc., fail-over is carried out manually.

The SVP manager 709 provides various kinds of service to the management terminal 160 in accordance with requests from the management terminal 160. For example, the SVP manager 709 provides various kinds of set contents concerning the storage system 600, such as set contents of LUs and set contents of RAID, to the management terminal 160 and reflects various kinds of setting concerning the storage system 600 given from the management terminal 160.

(Mechanism of Failure Management)

Figure 13:
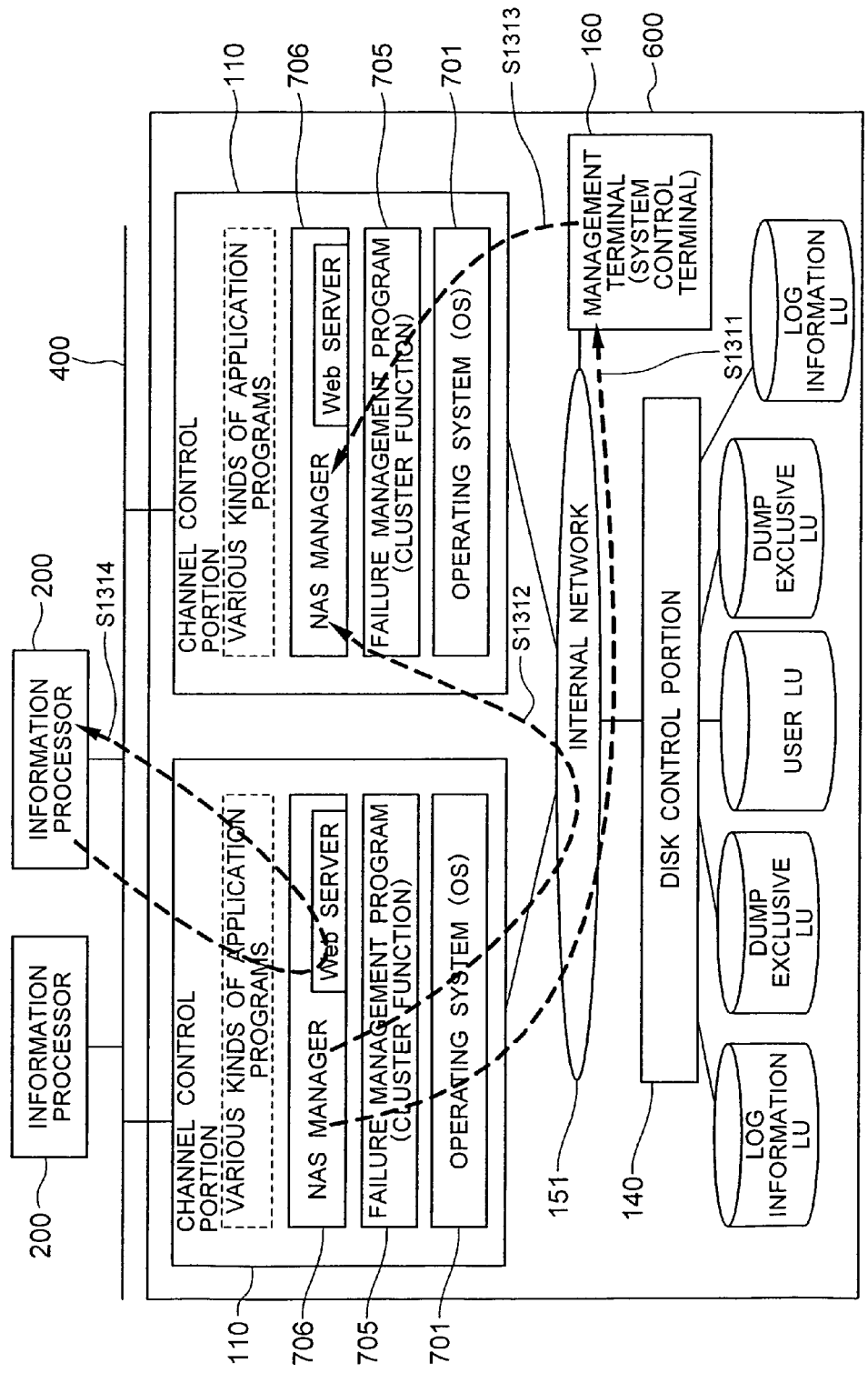
FIG. 13 is a diagram for explaining the mechanism of failure management in this embodiment.

The mechanism of failure management in the storage system 600 according to this embodiment will be described with reference to FIG. 13. Incidentally, FIG. 13 shows only hardware and software required for the description. As described above, the OS 701 and application programs operate in each channel control portion 110. As shown in FIG. 13, when failure occurs in the OS 701 or application programs operating in each channel control portion 110, a notice of occurrence of failure is given from one of the channel control portions 110 and the disk control portions 140 to the management terminal 160 (S1311). Upon reception of the notice of occurrence of failure, the management terminal 160 gives a notice of occurrence of failure to the operator or the like of the management terminal 160 by indicating a warning message on a display or issuing a warning buzzer. As a result, the operator or the like of the management terminal 160 can know that failure occurs in the OS 701 or application programs operating in each channel control portion 110.

When failure occurs in the OS 701 or application programs operating in a certain channel control portion 110, a notice of occurrence of failure is given to the NAS managers 706 executed by the other channel control portions 110 through the internal LAN 151. This notice may be given from one of the channel control portions 110 and the disk control portions 140 to the NAS managers 706 executed by the other channel control portions 110 directly through the internal LAN 151 (S1312) or indirectly through the management terminal 160 (S1311 and S1313). Especially, in the mechanism in which the notice is given from one of the channel control portions 110 to the other channel control portions 110 directly, the place where the failure occurs and the cause of the failure (whether the cause of the failure is the channel control portion 110 itself or not) can be specified easily because the failure has no relationship with failure in other devices such as failure in the management terminal 160. Furthermore, the notice can be given rapidly because the notice is not relayed by any other device. On the other hand, in the mechanism in which the notice is given to the NAS managers 706 executed by the channel control portions 110 indirectly through the management terminal 160, the channel control portions 110 as notice destinations can be designated by the management terminal 160. Accordingly, for example, the management terminal 160 can control notice destinations so that the notice is not given to channel control portions 110 that need not to be notified. Because the notice given to the other channel control portions 110 is controlled by the management terminal 160, the configuration of each channel control portion 110 can be simplified and processing load on the channel control portion 110 side can be lightened. Furthermore, even in the case where the notice of occurrence of failure cannot be given from one of the channel control portions 110 to the other channel control portions 110 directly because of some obstacle, the notice of occurrence of failure can be given to the other channel control portions 110 surely because the notice is given to the other channel control portions 110 through the management terminal 160.

Incidentally, each NAS manager 706 functions as a Web server for the information processors 200 connected to the external LAN 400. The NAS manager 706 generates a Web page in which the failure status of the OS 701 or application programs reported by the channel control portions 110, the disk control portions 140, etc. is written, and provides the Web page to an information processor 200 gaining access to the NAS manager 706 through the external LAN 400 (S1314). The user, the operator, or the like of the information processor 200 can use the Web page for checking whether or not failure occurs in the OS 701 or application programs operating in each channel control portion 110.

In the storage system 600 according to the invention, the notice of occurrence of failure in the OS 701 or application programs operating in each channel control portion 110 is given to the management terminal 160 or the NAS managers 706 by the spontaneous action (push action) of each of the channel control portions 110 and the disk control portions 140. That is, when one of the channel control portions 110 and the disk control portions 140 detects the fact that some failure occurs in the OS 701 or application programs operating in a certain channel control portion 110, it spontaneously gives a notice of occurrence of failure to the management terminal 160 or the other channel control portions 110.

In this manner, in the storage system 600 according to this embodiment, the notice of occurrence of failure in the OS 701 or application programs operating in a certain channel control portion 110 is spontaneously given from one of the channel control portions 110 and the disk control portions 140 to the management terminal 160 or the other channel control portions 110. Accordingly, when failure occurs in the OS 701 or application programs operating in a certain channel control portion 110, the notice of the occurrence of failure can be given to the management terminal 160, the other channel control portions 110, and the information processor 200 rapidly. Hence, the user, the operator, or the like can find the occurrence of failure in each channel control portion 110 at an early stage, so that a fail-over process or a restoration process can be hastened smoothly. In addition, because the notice is given spontaneously in this manner, the mechanism for monitoring other devices by a polling process or the like is not required. Accordingly, the configuration of the management terminal 160 and each channel control portion 110 can be simplified so that processing load on the management terminal 160 and each channel control portion 110 can be lightened.

The aforementioned mechanism for monitoring failure in the OS 701 or application programs operating in each channel control portion 110 in the storage system 600 according to this embodiment will be described below more specifically.

(Dump Information)

The aforementioned dump information output from the OS 701 operating in each channel control portion 110 will be described first. The dump information is information that is output from the OS 701 when a process executed by the OS 701 is terminated abnormally or when the OS 701 itself has a fault. FIG. 14 shows an example of the data format of the dump information. In the data format 1400, the ID of each channel control portion 110 is set in an "NAS Number" field. The network address of each channel control portion 110 is set in a "Network Address" field. For example, the network address is an IP address given to a device on the internal LAN 151. The time when the dump information was generated is set in a "Dump Generation Time" field. The actual data of the dump information is set in a "Dump Data" field. For example, the actual data is a memory image at a point of time when a process was terminated abnormally. Incidentally, when, for example, the OS 701 is UNIX (registered trademark), the dump information is output from the OS 701 triggered by a point of time when a process executed by the OS 701 receives a specific signal. For example, the dump information is used for pursuing the cause of abnormal termination of the process or the OS 701 or used for debugging a program.

In the storage system 600 according to this embodiment, the dump information output from the OS 701 operating in each channel control portion 110 is stored in an LU. The LU is provided as an exclusive LU for storing dump information, that is, the LU is provided separately from an LU for storing user data. The LU for storing dump information is hereinafter referred to as "dump exclusive LU". The reason why dump information is stored in the exclusive LU in this manner is that user storage regions can be prevented, for example, from being eaten by such stored dump information. It is a matter of course that the storage system 600 may be configured so that dump information is stored in the user data LU without provision of any dump exclusive LU. In the storage system 600 according to this embodiment, the dump exclusive LU may be provided so as to correspond to each channel control portion 110 or the dump exclusive LU may be used in common with all the channel control portions 110, that is, the dump exclusive LU may be set so that all dump information output from OSs 701 operating in different channel control portions is stored in one dump exclusive LU. In the case where the dump exclusive LU is operated so as to be shared in this manner, there is an advantage that the number of LUs for storing dump information can be reduced compared with the case where the dump exclusive LU is operated so as not to be shared.

In the case where the dump exclusive LU is operated so as to be used in common with a plurality of channel control portions 110, the storage region of the dump exclusive LU may be controlled to be divided into a plurality of storage regions (hereinafter referred to as partitions) so that dump information corresponding to one channel control portion 110 can be stored in one partition. In this case, information concerning dump information stored in partitions of each LU can be managed by the LU as represented by a storage region management table 1500 shown in FIG. 15. Incidentally, the identifier of each partition set in the LU is set in a "Storage Region" field in FIG. 15. Information indicating whether dump information is written or not is set in a "Dump Information" field. The ID of a channel control portion 110 to which the partition is assigned is set in an "NAS ID" field. The time of generation of dump information is set in a "Dump Generation Time" field. Because channel control portions 110 are set so that dump information can be stored in accordance with each partition in this manner, for example, dump information output from a certain channel control portion 110 can be prevented from being overwritten by dump information output from another channel control portion 110.

(Notice from Channel Control Portion)

Figure 16:
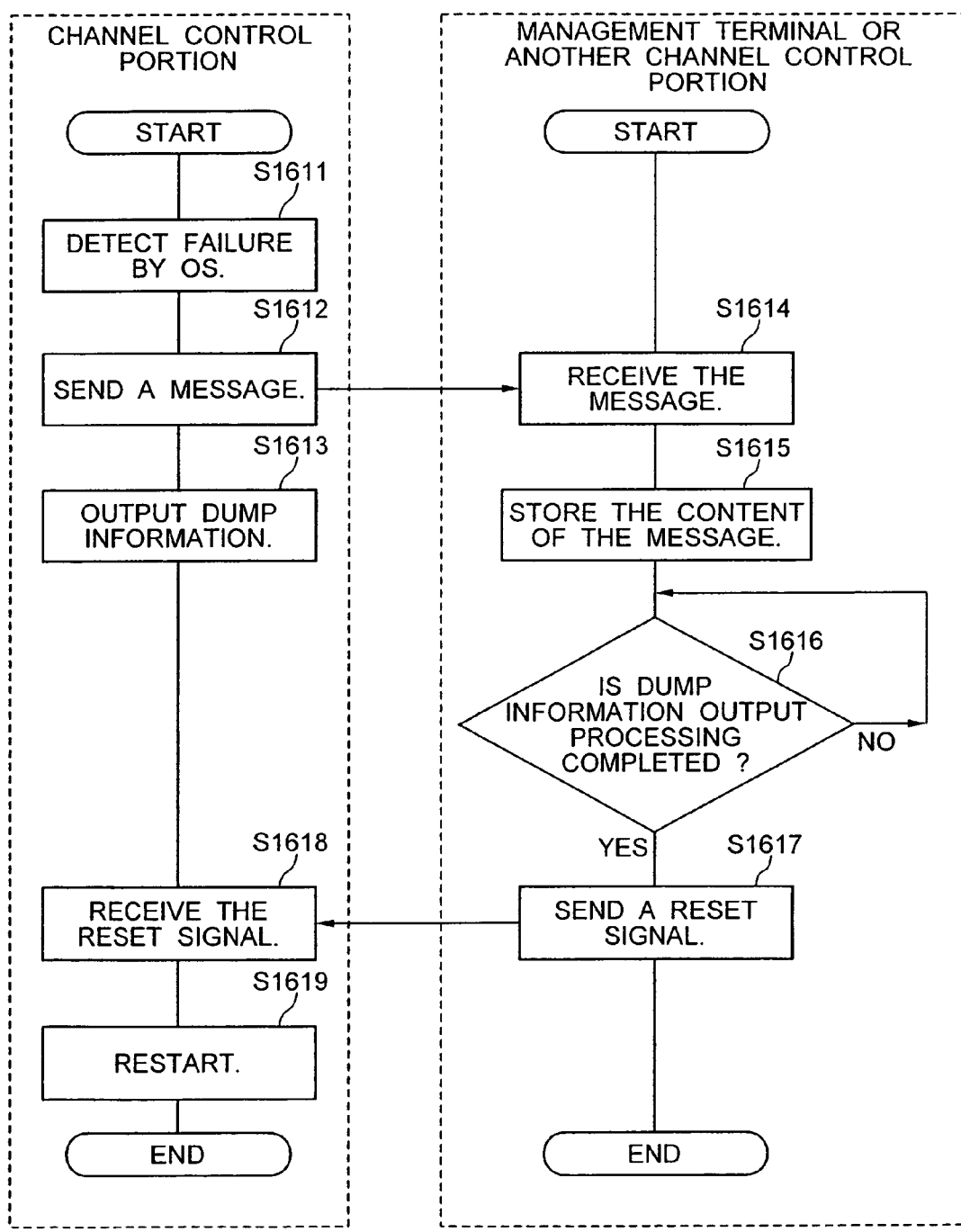
FIG. 16 is a flow chart for explaining the mechanism in which a notice of occurrence of failure in a channel control portion is spontaneously given to the management terminal or another channel control portion in this embodiment.

The mechanism in which a notice of occurrence of failure is spontaneously given from a certain channel control portion 110 to the management terminal 160 or other channel control portions 110 when some failure occurs in the OS 701 or application programs executed in the certain channel control portion 110 will be described below with reference to a flow chart shown in FIG. 16. The OS 701 executed in a certain channel control portion 110 detects the fact that some failure occurs in the OS 701 itself or in application programs executed on the OS 701 (S1611). The channel control portion 110 recognizes occurrence of failure, for example, by detecting generation of an interrupt operation concerning failure or dump information output from the OS 701 executed in the channel control portion 110. Then, the channel control portion 110 sends a message with a notice of occurrence of failure in itself to the management terminal 160 or the other channel control portions 110 through the internal LAN 151 (S1612).

FIG. 17 shows an example of the data format of the aforementioned message. In the data format 1700, the ID of the failed channel control portion 110 is set in a "Failed NAS Identifier" field. A network address on the internal LAN 151, assigned to the failed channel control portion 110 is set in a "Network Address" field. For example, the network address is an IP address. The time of occurrence of failure is set in a "Failure Occurrence Time" field. An LUN (Logical Unit Number) which is the identifier of an LU as an output destination for storing dump information output from the OS 701 executed in the channel control portion 110 is set in a "Dump Information Storage LU" field. The identifier (ID) of a partition assigned as an output designation of the channel control portion 110 is set in a "Storage Region" field. Information indicating whether the occurrence of failure is caused by a fault of the OS 701 or by a fault of application programs is set in a "Failure Occurrence Factor" field. Incidentally, before the message is sent to the other channel control portions 110, preliminary checking may be made so that an inquiry is given to the management terminal 160 or an SNMP as to whether the other channel control portions 110 operate normally or not.

Referring back to FIG. 16, the description will continue. When, for example, the OS 701 detects failure in the OS 701 itself, the OS 701 sends dump information to an LU (S1613). On the other hand, the management terminal 160 or the NAS manager 706 of each of the other channel control portions. 110 receives the massage (S1614) and stores the message in a memory 113 (S1615). For example, the content of the message stored in the memory 113 in this manner is indicated on a display of the management terminal 160, or written on the Web page provided by the NAS manager 706. In this manner, a notice of occurrence of failure is spontaneously given from the channel control portion 110 to the management terminal 160 or the other channel control portions 110.

The management terminal 160 or each NAS manager 706 monitors the channel control portion 110 as a message sender through the internal LAN 151 as to whether processing concerning output of dump information from the channel control portion 110 is completed or not (S1616). When the management terminal 160 or each NAS manager 706 recognizes completion of output of dump information, the management terminal 160 or each NAS manager 706 sends a reset signal to the channel control portion 110 as a message sender (S1617). Upon reception of the reset signal (S1618), the channel control portion 110 controls itself to re-start (S1619). In this manner, an operation of resetting the failed channel control portion 110 is carried out automatically by the management terminal 160 or each NAS manager 706. Accordingly, the time required for restoration after occurrence of failure can be reduced, so that the bad influence on the user can be reduced as sufficiently as possible.

(Notice from Disk Control Portion)

Figure 18:
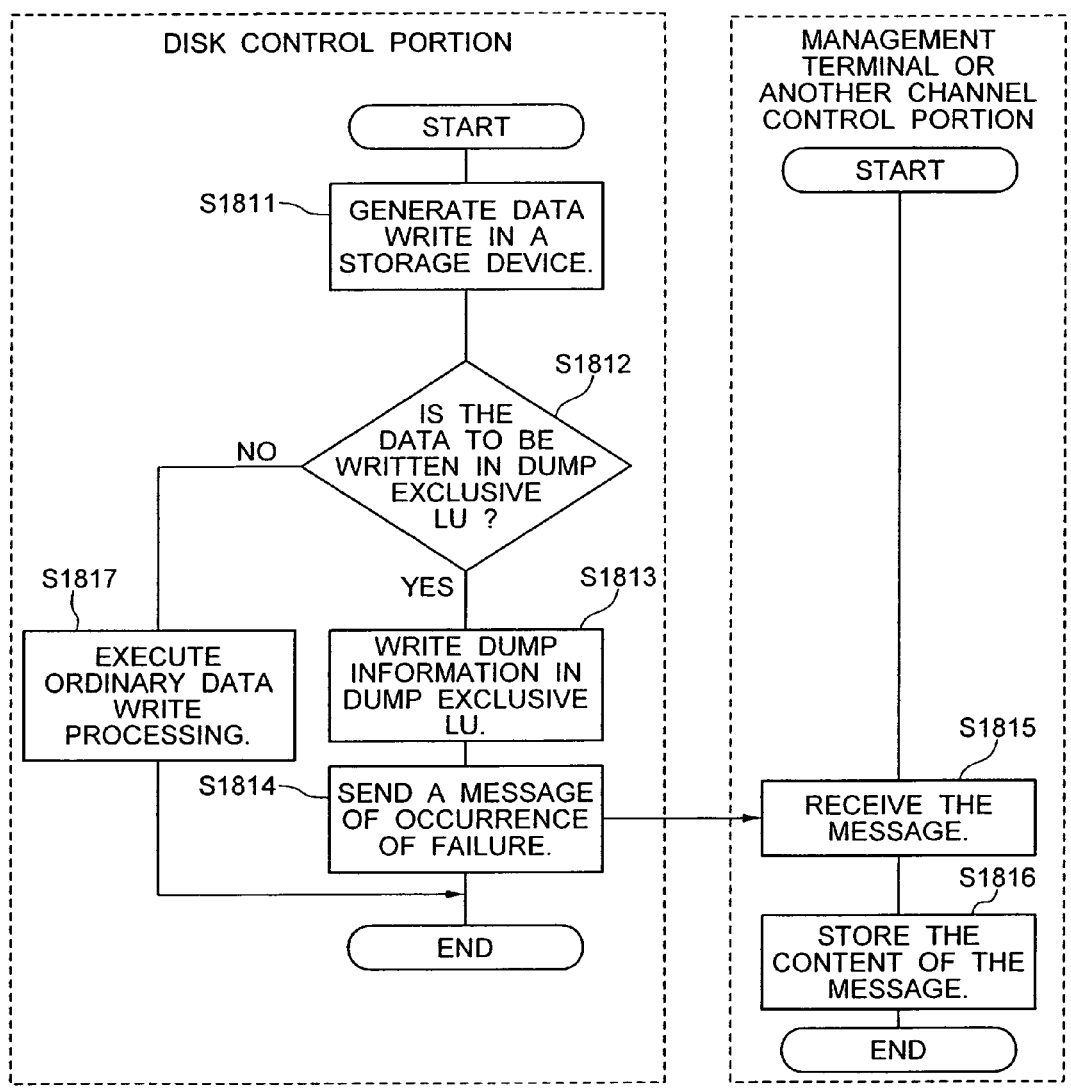
FIG. 18 is a flow chart for explaining the mechanism in which a notice of occurrence of failure in a channel control portion is spontaneously given from a disk control portion to the management terminal or another channel control portion in this embodiment.

When some failure occurs in a certain channel control portion 110, a disk control portion 140 also gives a notice of occurrence of failure to the management terminal 160 or the other channel control portions 110. The mechanism in this case will be described specifically with reference to a flow chart shown in FIG. 18.

When a disk control portion 140 detects the fact that some data is written in a storage device 300 (S1811), the disk control portion 140 judges whether the LU as a write destination of the data is a dump exclusive LU or not (S1812). This judgment is based on comparison between the LU set as a data write destination and a dump exclusive LU management table 2000 (which will be described later with reference to FIG. 20) stored in the NVRAM 144 of the disk control portion 140.

Figure 19:
FIG. 19 is a view showing a format of data indicating a write destination of data stored in a cache memory in this embodiment.
Figure 20:
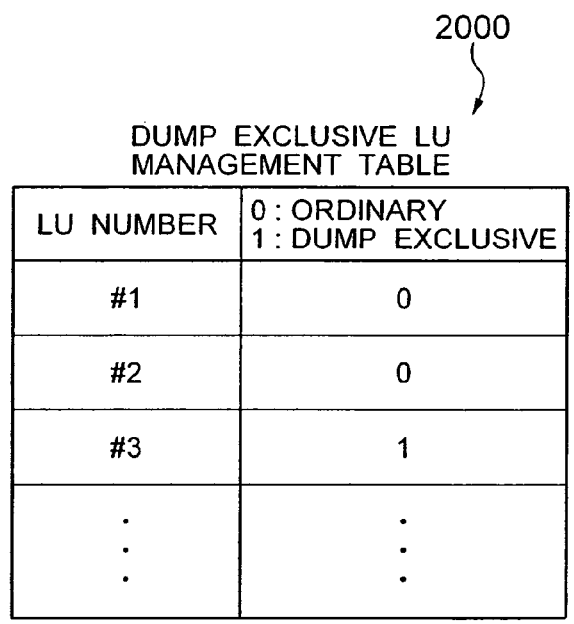
FIG. 20 is a view showing an example of a dump exclusive LU management table in this embodiment.

The data write destination, for example, having a data format shown in FIG. 19, is stored in the cache memory 130. The data format 1900 is arranged to contain the ID of the channel control portion 110 that sets the write data in the cache memory 130 (i.e., the channel control portion 110 that gives an instruction to write the data), the identifier (LUN) of the LU as the data write destination, and information (e.g., top address) for specifying the storage position on the write destination LU, of the data to be written. As shown in FIG. 20, the dump exclusive LU management table 2000 indicates whether the LU corresponding to each LUN is a dump exclusive LU or not. The disk control portion 140 compares the LUN set in the data format with the dump exclusive LU management table 2000 to thereby judge whether the write destination is a dump exclusive LU or not (S1812). Making a decision in the step S1812 that the write destination is a dump exclusive LU (S1812: YES), the disk control portion 140 writes the data in the dump exclusive LU (i.e., writes dump information in the dump exclusive LU) (S1813) and sends a message with a notice of occurrence of some failure in the channel control portion 110 to the management terminal 160 or the other channel control portions 110 (S1814). Incidentally, before the message is sent to the other channel control portions 110, preliminary checking may be made so that an inquiry is given to the management terminal 160 as to whether the other channel control portions 110 operate normally or not. For example, the contents of the message sent in this case are the same as shown in FIG. 17.

Upon reception of the message (S1815), the management terminal 160 or each of the other channel control portions 110 stores the contents of the message in its own memory (S1816). On the other hand, making a decision in the step S1812 that the destination as a subject of the data write request is another LU than the dump exclusive LU (S1812: NO), the disk control portion 140 makes data write (S1817) but does not send the message. By the aforementioned mechanism, a notice of occurrence of failure in a certain channel control portion 110 can be spontaneously given from the disk control portion 140 to the management terminal 160 or the other channel control portions 110.

Because a notice of dump information output from the OS 701 is spontaneously issued from the disk control portion 140 by the aforementioned mechanism of the disk control portion 140, the notice of dump information output from the OS 701 can be given to the management terminal 160 or the other channel control portions 110 even in the case where a notice of occurrence of failure cannot be given to the management terminal 160 because of some failure in communication between the channel control portion 110 and the management terminal 160 or each of the other channel control portions 110. Incidentally, an example of the aforementioned case is the case where failure occurs in the OS 701 so that dump information can be written by the OS 701 but a notice of occurrence of failure cannot be sent to the management terminal 160 or the other channel control portions 110.

When some failure occurs in communication between the disk control portion 140 and the management terminal 160 or each of the other channel control portions 110, a notice of occurrence of failure is spontaneously sent from the channel control portion 110 to the management terminal 160 or the other channel control portions 110 by the aforementioned mechanism. In this manner, in the storage system 600 according to this invention, a notice from the channel control portion 110 and a notice from the disk control portion 140 are issued complementarily, so that the notice of occurrence of failure in a certain channel control portion 110 can be surely given to the management terminal 160 or the other channel control portions 110. In addition, when notices are issued from both the channel control portion 110 and the disk control portion 140 complementarily in the aforementioned manner, the operator or the like can guess where failure occurs in constituent elements of the storage system 600 by checking whether the notice from each path is given normally or not.

(Notice from Management Terminal)

Figure 21:
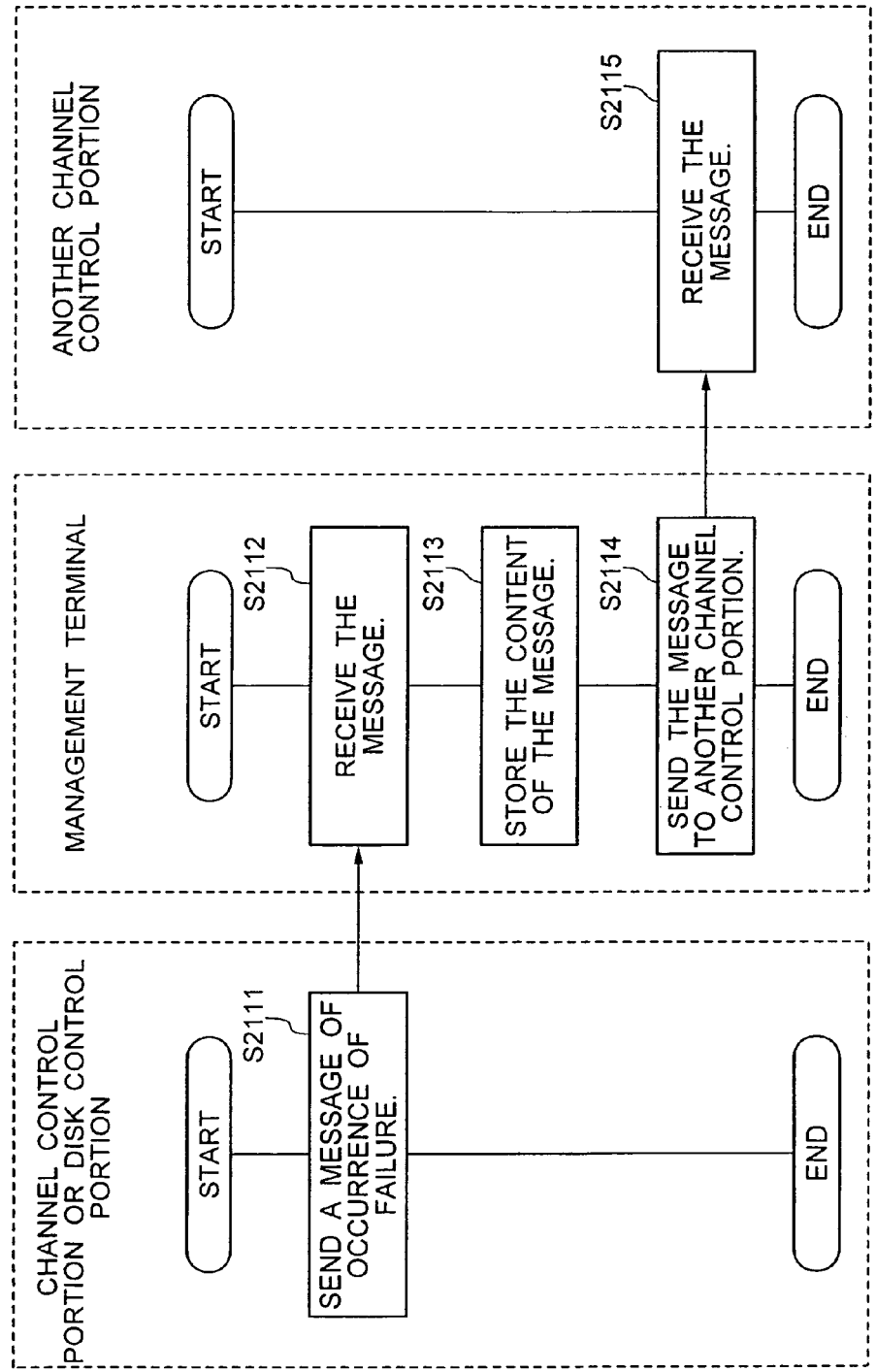
FIG. 21 is a flow chart for explaining the mechanism in which a notice of occurrence of failure in a channel control portion is given to another channel control portion indirectly through the management terminal in this embodiment.

In the aforementioned failure management mechanism, when failure occurs in a certain channel control portion 110, a notice of occurrence of failure is directly sent from the channel control portion. 110 or the disk control portion 140 to the other channel control portions 110. The notice of occurrence of failure in the channel control portion 110 may be however received by the management terminal 160 so that this notice is indirectly sent to the other channel control portions 110 through the management terminal 160. This mechanism will be described with reference to a flow chart shown in FIG. 21.

A channel control portion 110 or a disk control portion 140 sends a message with a notice of occurrence of failure (S2111). Upon reception of the message from the channel control portion 110 or the disk control portion 140 (S2112), the management terminal 160 stores the contents of the message (S2113). Then, the management terminal 160 sends a message with a notice of occurrence of failure in the channel control portion 110 as a message sender to channel control portions 110 (that is, the other channel control portions 110) different from the channel control portion 110 that is set as a sender in the message (S2114). On this occasion, the channel control portions 110 as message sending destinations are recorded in the management terminal 160. FIG. 22 shows an example of a notice destination table 2200. That is, the message is sent to channel control portions 110 registered in the notice destination table 2200. In FIG. 22, the network address (IP address) of each channel control portion as a notice destination is set in a "Notice Destination" field, and the type of each device as a notice destination is set in a "Device Type" field. For example, the contents of the notice destination table 2200 are set by the operator or the like operating the management terminal 160.

Each of the other channel control portions 110 receives the message sent in this manner (S2115). For example, the contents of the message are used by the NAS manager 706. Incidentally, the contents of the received message are given to the NAS manager 706 executed in each of the other channel control portions 110.

Because the notice is sent to the other channel control portions 110 indirectly through the management terminal 160 in this manner, for example, the management terminal 160 can specify channel control portions 110 as notice destinations. That is, the management terminal 160 can control notice destinations so that the notice of occurrence of failure is not given to unnecessary channel control portions 110. Furthermore, the notice can be prevented from being repeatedly given to a plurality of channel control portions 110. Because the notice is sent to the other channel control portions 110 indirectly through the management terminal 160, the configuration of each channel control portion 110 can be simplified so that processing load on the channel control portion 110 side can be lightened. In addition, even in the case where the notice of occurrence of failure cannot be directly sent from a channel control portion 110 to the other channel control portions 110 because of some obstacle, the notice can be indirectly sent to the other channel control portions 110 through the management terminal 160.

(Function of Management Terminal)

The management terminal 160 has a user interface for monitoring the states of execution of the OS 701 or application programs executed in each channel control portion 110. The management terminal 160 receives a notice of occurrence of failure from a channel control portion 110 or a disk control portion 140 and indicates a screen for informing the operator or the like of the contents of the notice (hereinafter referred to as failure notice screen) on a display.

FIG. 23 shows an example of the failure notice screen. In the failure notice screen 2300 shown in FIG. 23, an identifier uniquely assigned to each channel control portion 110 is indicated in a "Channel Control Portion ID" field. The operating state of each channel control portion 110 is indicated in a "Status" field. When the channel control portion 110 operates normally, "Normal" is indicated in this field. When failure (abnormality) occurs in the channel control portion 110, "Failed" is indicated in this field. The place from which the notice of occurrence of failure in the channel control portion 110 indicated by "Failed" in the "Status" field was given is indicated in a "Notice Source" field. The network address (e.g., IP address) on the internal LAN 151, of the device as a notice sender is indicated in this field. The operator or the like can know the presence/absence of occurrence of failure in each channel control portion 110 by referring to the failure notice screen 2300. The operator or the like can guess the cause of failure by referring to the "Notice Source" field. When, for example, the network address assigned to a certain channel control portion 110 is indicated in the "Notice Source" field, the operator or the like can guess that the notice function of the channel control portion 110 operated normally at least at a point of time when the notice was sent because the channel control portion 110 itself sent the notice of occurrence of failure. When, for example, the network address assigned to a disk control portion 140 is indicated in the "Notice Source" field, the operator or the like can guess that some failure occurred in the notice function of the channel control portion 110.

(Integral Management of Failure)

When some failure occurs in the OS 701 or application programs executed in a certain channel control portion 110, a notice of occurrence of failure is given from the OS 701 or application programs detecting the failure to the NAS manager 706. The channel control portion 110 sends the notice of occurrence of failure to the NAS managers 706 executed in the other channel control portions 110. Upon detection of occurrence of failure in another channel control portion 110 belonging to a cluster, the failure management program 705 gives a notice of occurrence of failure to the NAS manager 706. In this manner, information concerning failure in the whole of the storage system 600 is collected into the NAS manager 706 executed in each channel control portion 110. Accordingly, failure in the storage system 600 can be integrally managed.

Upon reception of the notice of occurrence of failure, the NAS manager 706 sends this notice and information generated on the basis of this notice concerning failure in the channel control portion 110 to the information processor 200 or the management terminal 160 by e-mail, SNMP, TCP/IP, etc. FIG. 24 shows an example of the contents of data sent by e-mail, etc. In FIG. 24, the ID of the failed channel control portion 110 is set in a "Failed NAS Identifier" field. The network address (e.g., IP address) of the failed channel control portion 110 is set in a "Network Address" field. The time of occurrence of failure in the channel control portion 110 is set in a "Failure Occurrence Time" field. The LUN as the identifier of the LU in which dump information output from the failed channel control portion 110 is stored is set in a "Dump Information Storage LU" field. The ID of the partition in which dump information is stored is set in a "Storage Region" field. In this manner, information concerning failure is sent to the information processor 200 by e-mail. Accordingly, the user, the operator, or the like of the information processor 200 can specify the failed channel control portion 110 easily. In addition, when failure occurs, a process for pursuing the cause of the failure and performing recovery from the failure can be carried out smoothly.

The NAS manager 706 also has a mechanism for generating a Web page on the basis of the messages received from other channel control portions 110 or the management terminal 160 so that the states of failure in respective channel control portions 110 in the storage system 600 are written in the Web page. FIG. 25 shows an example of the Web page. In the Web page 2500, the name of each failed channel control portion 110 is set in a "Failed NAS Name" field. The time of occurrence of failure is set in a "Failure Occurrence Time" field. Information necessary for grasping the state of failure as to whether the failure is caused by the OS 701 or by application programs is set in a "Failure Content" field. The user, the operator, or the like of the information processor 200 can know the states of failure in channel control portions in the storage system 600 by accessing the Web page from the information processor 200.

Figure 26:
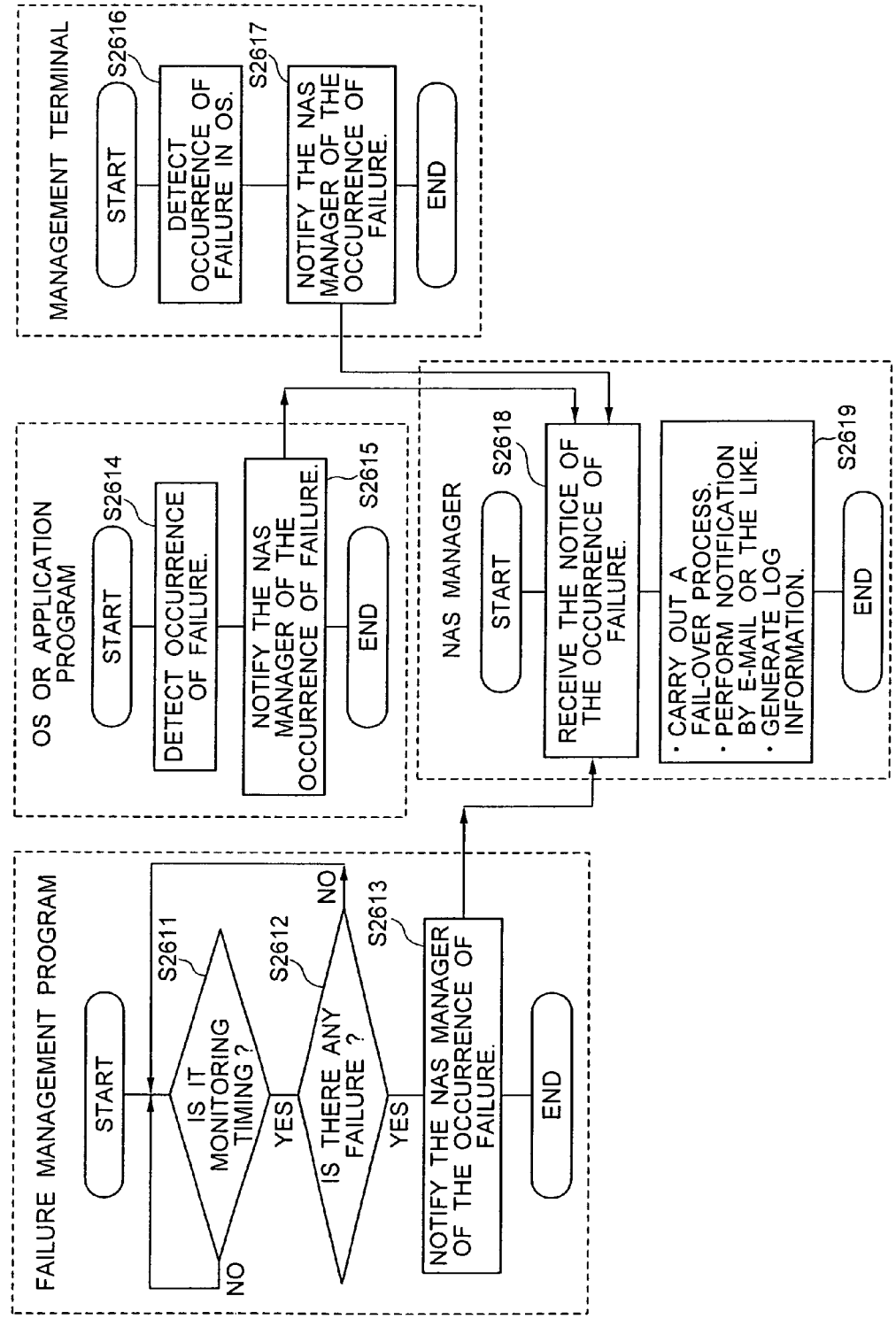
FIG. 26 is a flow chart for explaining the mechanism in which processing of fail-over, notification by e-mail, etc. is executed when a notice of occurrence of failure is given to an NAS manager in this embodiment.

Upon reception of a notice of occurrence of failure, for example, the NAS manager 706 cooperates with the failure management program 705 to execute a process such as fail-over between channel control portions 110, notification by e-mail, etc. This mechanism will be described with reference to a flow chart shown in FIG. 26.

The failure management program 705 monitors occurrence of failure in the OS 701 and application programs at set time intervals (S2611). When the failure management program 705 detects occurrence of failure (S2612: YES), the failure management program 705 gives a notice of occurrence of failure to the NAS manager 706 (S2613). On the other hand, when the OS 701 or some application program detects occurrence of failure (S2614), the OS 701 or application program gives a notice of occurrence of failure to the NAS manager 706 (S2615). When the management terminal 160 detects occurrence of failure in the OS 701 operating in a certain channel control portion 110 by the aforementioned mechanism (S2616), the management terminal 160 also gives a notice of occurrence of failure to the NAS manager 706 (S2617). Upon reception of the notice of occurrence of failure from the failure management program 705, the OS 701 or application program or the management terminal 160 (S2618), the NAS manager 706 carries out fail-over, sending of the notice to the information processor 200 by e-mail or the like, outputting of information concerning failure to the log information LU, and so on. In this manner, failure management can be centralized by the mechanism of integral failure management collected into the NAS manager 706, so that the system can be operated and managed easily.

(Method for Specifying Failed Place)

Figure 27:
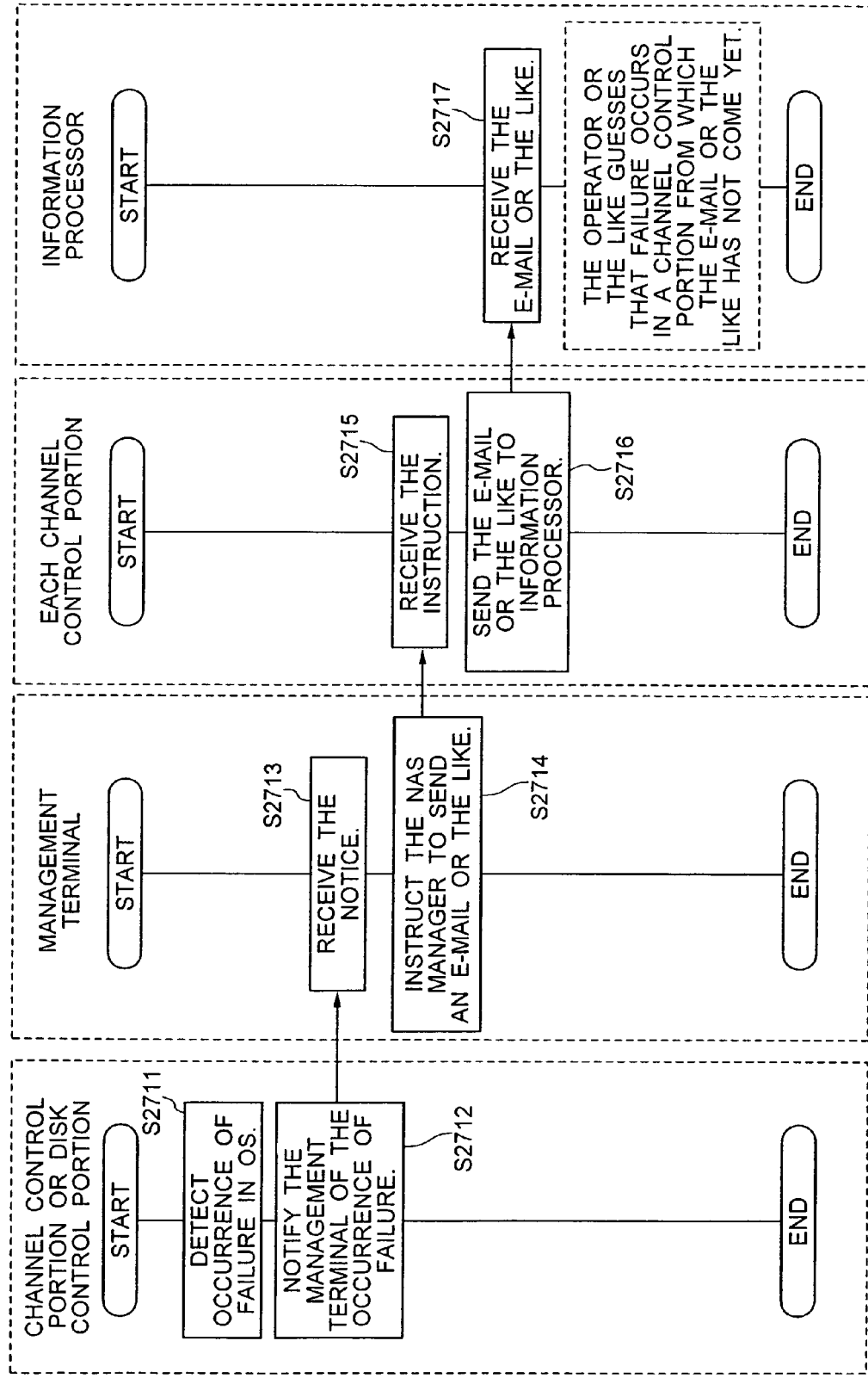
FIG. 27 is a flow chart for explaining the mechanism in which each NAS manager receiving a notice of occurrence of failure always gives the notice to an information processor by e-mail or the like so that the information processor can guess the failed channel control portion in this embodiment.

Incidentally, when the management terminal 160 instructs the NAS manager 706 executed in each channel control portion 110 to send some notice to the information processor 200 by e-mail or the like, no notice can be issued from the channel control portion 110 having a fault of the notice function so that it is possible to specify the failed channel control portion 110. This mechanism will be described specifically with reference to FIG. 27.

When failure occurs in a certain channel control portion 110 (S2711), a notice of occurrence of failure is sent to the management terminal 160 (S2712). Upon reception of this notice (S2713), the management terminal 160 instructs all channel control portions 110 inclusive of the failed channel control portion 110 to send this notice to the information processor 200 by e-mail or the like (S2714). Upon reception of this instruction (S2715), each channel control portion 110 sends the notice of occurrence of failure to the information processor 200 by e-mail or the like (S2716). The information processor 200 receives the notice by e-mail or the like (S2717). On this occasion, because the failed channel control portion 110 cannot send the notice to the information processor 200 by e-mail or the like, the operator or the like of the information processor 200 can guess that failure occurs in the channel control portion 110 from which the notice has not come yet (S2718).

(Dump Information Notice Function)

Figure 28:
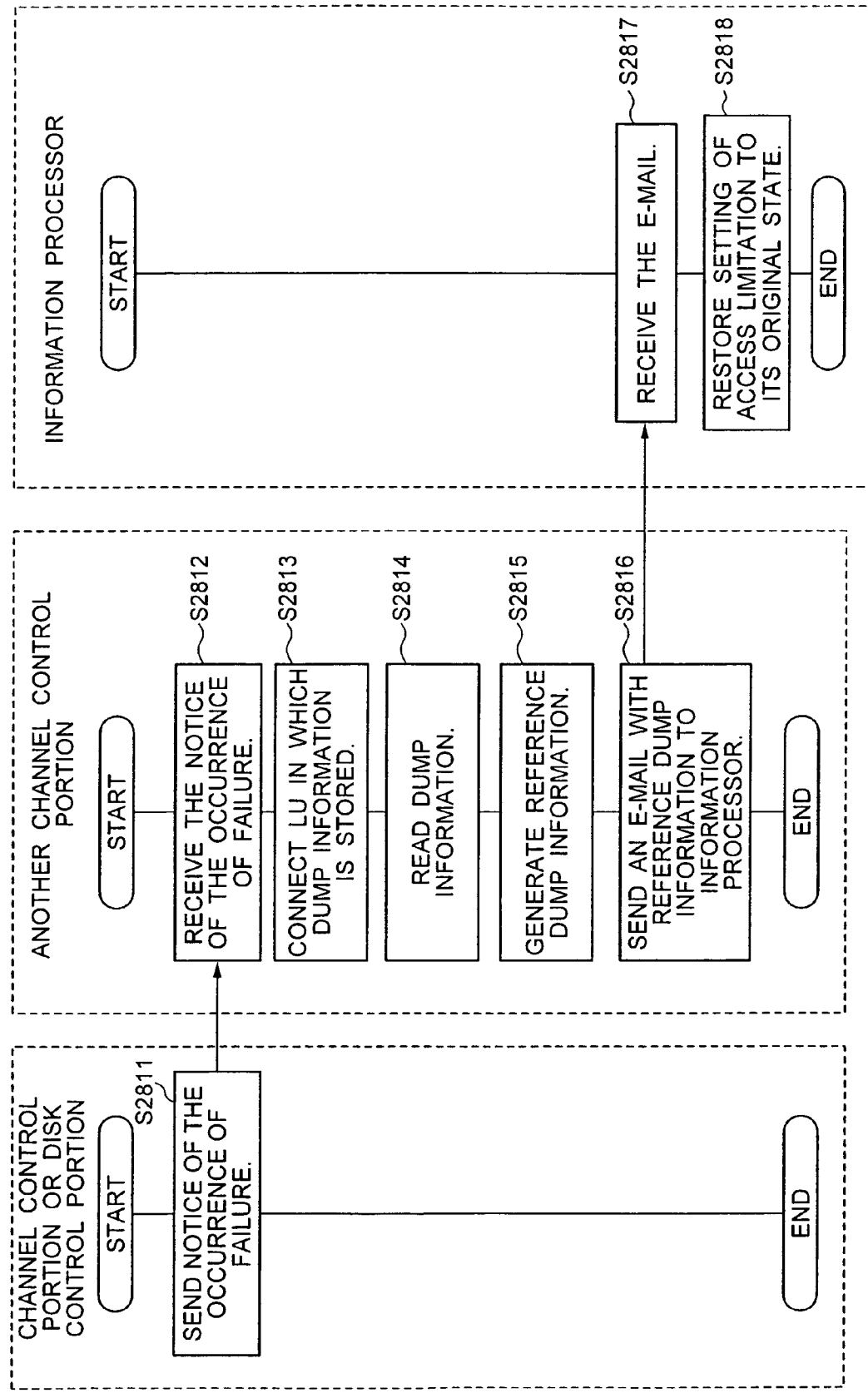
FIG. 28 is a flow chart for explaining the mechanism in which an e-mail with the content of dump information is sent to an information processor in this embodiment.

The NAS manager 706 executed in each channel control portion 110 has a function for writing the content of dump information in an e-mail and sending the e-mail to the information processor 200. This mechanism will be described with reference to a flow chart shown in FIG. 28 taking as an example the case where the NAS manager 706 sends an e-mail with the content of dump information to the information processor 200.

When some failure occurs in a certain channel control portion 110, the OS 701 of the channel control portion 110 outputs dump information to the dump exclusive LU. The channel control portion 110 or a disk control portion 140 sends a message with a notice of occurrence of failure to the other channel control portions 110 directly or indirectly through the management terminal 160 (S2811). For example, the data format of the message is the same as shown in FIG. 17. Upon reception of the message (S2812), the NAS manager 706 executed in each of the other channel control portions 110 alters setting of access limitation in the storage system 600 so that the LU in which the dump information is stored can be accessed (S2813). Then, the NAS manager 706 reads the dump information from the LU specified by the message through the internal LAN 151 (S2814). Incidentally, when the LU is divided into storage regions, a pertinent storage region can be specified by referring to the content of the "Storage Region" field set in the message.

Then, the NAS manager 706 executed in each of the other channel control portions 110 removes information, such as cache information that need not be referred to by the user or the like from the dump information read from the LU and performs data compression to thereby generate reference dump information to be attached to an e-mail (S2815). The format of the dump information stored in the LU may be unable to be used by the file system as it is. In this case, the format of the dump information is converted into a format (e.g., a text data format) that can be referred to by the file system. Then, the NAS manager 706 executed in each of the other channel control portions 110 generates an e-mail with the generated reference dump information and sends the generated e-mail to the information processor 200 (S2816). The information processor 200 receives the e-mail (S2817). Incidentally, the NAS manager 706 executed in each of the other channel control portions 110 restores the setting of access limitation as occasion demands after sending the e-mail.

In this manner, when failure occurs, dump information concerning the failure is sent to the user, the operator, or the like of the information processor 200 by e-mail rapidly.

Accordingly, the user, the operator, or the like can smoothly take measurements for pursuing the cause of the failure, performing recovery from the failure, etc. In addition, the user, the operator, or the like is released from troublesome dump information collection work such as work for specifying the location of dump information for pursuing the cause of the failure in the channel control portion 110 and recovering the failed channel control portion and work for converting the specific format of dump information stored in the LU into a referable format. Accordingly, the user, the operator, or the like can rapidly take measurements for pursuing the cause of the failure and recovering the failed channel control portion.

Although the above description has been made on the configuration in which the NAS manager 706 plays a main role in providing dump information to the information processor 200, configuration may be made so that the management terminal 160 communicatably connected to the information processor 200 plays a main role in providing dump information to the information processor 200. Upon reception of a notice of occurrence of failure in a certain channel control portion 110, the management terminal 160 may control the NAS manager 706 executed in each of the other channel control portions 110 to send an e-mail with the dump information to the information processor 200. Incidentally, in this case, configuration may be made so that the NAS manager 706 generates reference dump information or configuration may be made so that the management terminal 160 generates reference dump information and provides the reference dump information to the NAS manager 706. Although the above description has bee made on the configuration in which the NAS manager 706 adds dump information into an e-mail, configuration may be made so that dump information is provided to the information processor 200 by a communication protocol such as SNMP, TCP/IP, or the like, instead of the e-mail.

Although the embodiment has been described above, the embodiment is provided for facilitating understanding of the invention but not for interpreting the invention restrictively. The invention may be changed or modified without departing from the gist of the invention, and may contain changes or modifications equivalent thereto.

What is claimed is:

1. A method of controlling a storage system, wherein:
said storage system includes: channel control portions each including a circuit board on which a file access processing portion for receiving file-by-file data input/output requests sent from information processors through a network and an I/O processor for outputting I/O requests corresponding to said data input/output requests to storage devices are formed; disk control portions for performing data input/output of said storage devices in response to said I/O requests sent from said I/O processors; and a computer communicably connected to said channel control portions and said disk control portions; said method comprising:
storage regions for storing dump information concerning programs executed by said channel control portions are set in said storage devices; and
when one of said disk control portions makes a decision that said I/O request accepted from one of said channel control portions is for any one of said set storage regions, said disk control portion gives a notice of occurrence of failure in said channel control portion to said computer.

2. A method of controlling a storage system according to claim 1, wherein:
when each of said channel control portions receives a notice of occurrence of failure in a channel control portion, each of said channel control portions specifies the address on said storage devices, of dump information written by said failed channel control portion on the basis of said notice; and
each of said channel control portions acquires said dump information stored in said specified address and sends said dump information to said information processors.

3. A method of controlling a storage system according to claim 1, wherein said failure is caused by a fault in one of an operating system and an application program executed by each of said channel control portions.

4. A method of controlling a storage system, wherein:
said storage system includes: channel control portions each including a circuit board on which a file access processing portion for receiving file-by-file data input/output requests sent from information processors through a network and an I/O processor for outputting I/O requests corresponding to said data input/output requests to storage devices are formed; disk control portions for performing data input/output of said storage devices in response to said I/O requests sent from said I/O processors; and a computer communicably connected to said channel control portions and said disk control portions; said method comprising:
when one of said disk control portions detects the fact that dump information output from one of said channel control portions is written in one of said storage devices, said disk control portion gives a notice of occurrence of failure in said channel control portion to said computer.

5. A method of controlling a storage system according to claim 2, wherein each of said channel control portions processes said dump information stored in said storage devices into a data format that can be referred to by persons operating said information processors before each of said channel control portions sends said dump information to said information processors.

6. A storage system, wherein:
said storage system includes: channel control portions each including a circuit board on which a file access processing portion for receiving file-by-file data input/output requests sent from information processors through a network and an I/O processor for outputting I/O requests corresponding to said data input/output requests to storage devices are formed;
disk control portions for performing data input/output of said storage devices in response to said I/O requests sent from said I/O processors; and
a computer communicably connected to said channel control portions and said disk control portions; and
said storage system further includes means by which when one of said disk control portions detects the fact that dump information output from one of said channel control portions is written in any one of said storage devices, said disk control portion gives a notice of occurrence of failure in said channel control portion to said computer.

7. A program stored on a computer-readable medium and used in a storage system including: channel control portions each including a circuit board on which a file access processing portion for receiving file-by-file data input/output requests sent from information processors through a network and an I/O processor for outputting I/O requests corresponding to said data input/output requests to storage devices are formed; disk control portions for performing data input/output of said storage devices in response to said I/O requests sent from said I/O processors; and a computer communicably connected to said channel control portions and said disk control portions;

said program providing each of said disk control portions with a function by which when one of said disk control portions detects the fact that dump information output from one of said channel control portions is written in any one of said storage devices, said disk control portion gives a notice of occurrence of failure in said channel control portion to said computer.

* * * * *